(12) United States Patent
Tanabe

(10) Patent No.: US 9,362,782 B2
(45) Date of Patent: Jun. 7, 2016

(54) ELECTRONIC APPARATUS, CONTROL METHOD, AND RECORDING MEDIUM

(71) Applicant: CANON KABUSHIKI KAISHA, Tokyo (JP)

(72) Inventor: Akihiro Tanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 775 days.

(21) Appl. No.: 13/692,831

(22) Filed: Dec. 3, 2012

(65) Prior Publication Data

US 2013/0140906 A1 Jun. 6, 2013

(30) Foreign Application Priority Data

Dec. 5, 2011 (JP) ................................. 2011-265893

(51) Int. Cl.
*H01F 27/00* (2006.01)
*H02J 17/00* (2006.01)
*H02J 5/00* (2016.01)
*H04B 5/00* (2006.01)

(52) U.S. Cl.
CPC .................. *H02J 17/00* (2013.01); *H02J 5/005* (2013.01); *H04B 5/0031* (2013.01); *H04B 5/0037* (2013.01)

(58) Field of Classification Search
CPC ...................................................... H02J 5/005

USPC ........................................................ 307/104
See application file for complete search history.

(56) References Cited

U.S. PATENT DOCUMENTS

| 8,742,820 | B1 * | 6/2014 | Li | G06F 1/26 |
| | | | | 327/318 |
| 8,922,329 | B2 * | 12/2014 | Davis | H02J 7/025 |
| | | | | 320/108 |
| 8,929,957 | B2 * | 1/2015 | Toncich | H02J 7/025 |
| | | | | 455/573 |
| 2007/0057073 | A1 | 3/2007 | Mamba | |
| 2010/0176202 | A1 | 7/2010 | Teraoka | |
| 2011/0127843 | A1 | 6/2011 | Karaoguz | |

FOREIGN PATENT DOCUMENTS

| CN | 201904628 U | 7/2011 |
| JP | 2008131812 A | 6/2008 |
| JP | 2009-247125 A | 10/2009 |
| JP | 2010130835 A | 6/2010 |
| JP | 2011-029799 A | 2/2011 |
| JP | 2011062008 A | 3/2011 |
| JP | 2011-123708 A | 6/2011 |

* cited by examiner

*Primary Examiner* — Stephen W Jackson
(74) *Attorney, Agent, or Firm* — Canon USA, Inc. IP Division

(57) ABSTRACT

An electronic apparatus includes a communication unit that performs wireless communication, a load unit, a power receiving unit that wirelessly receives power from a power supply apparatus, and a control unit that controls to limit a supply of power to the load unit if the communication unit transmits data to the power supply apparatus.

18 Claims, 9 Drawing Sheets

ELECTRONIC APPARATUS, CONTROL METHOD, AND RECORDING MEDIUM

BACKGROUND OF THE INVENTION

1. Field of the Invention

One disclosed aspect of the embodiments relates to an electronic apparatus capable of performing wireless communication, a control method, and a recording medium.

2. Description of the Related Art

In recent years, there has been known a charging system including a power supply apparatus wirelessly supplying power without being connected by a connector and an electronic apparatus receiving the power supplied from the power supply apparatus. Japanese Patent Application Laid-Open No. 2011-123708 discusses an electronic apparatus including a non-contact communication coil for wirelessly communicating with a reader-writer and a power receiving coil for receiving power supplied from a power supply apparatus in such a charging system.

When the power supply apparatus wirelessly supplies power, the above electronic apparatus charges a battery using the power received by a power receiving coil from the power supply apparatus.

However, when the power supply apparatus wirelessly supplies power, the electronic apparatus sometimes receives power from the power supply apparatus not by the power receiving coil, but by the non-contact communication coil. In the case where the non-contact communication coil receives power supplied from the power supply apparatus, it may cause an issue that the electronic apparatus cannot appropriately perform wireless communication with the reader-writer using the non-contact communication coil.

SUMMARY OF THE INVENTION

One disclosed aspect of the embodiments relates to an electronic apparatus capable of appropriately performing wireless communication in a case where the electronic apparatus is wirelessly supplied with power from a power supply apparatus.

According to an aspect of the embodiments, there is provided an electronic apparatus including a communication unit that performs wireless communication, a load unit, a power receiving unit that wirelessly receives power from a power supply apparatus, and a control unit that controls to limit a supply of power to the load unit if the communication unit transmits data to the power supply apparatus.

According to another aspect of the embodiments, there is provided an electronic apparatus including a communication unit that performs wireless communication, a power receiving unit that wirelessly receives power from a power supply apparatus, and a control unit that controls a predetermined level if the communication unit transmits data to the power supply apparatus, wherein the predetermined level indicates a level of power used for transmitting data.

According to yet another aspect of the embodiments, there is provided a method including performing wireless communication, wirelessly receiving power from a power supply apparatus, and controlling to limit a supply of power to a load unit if data is transmitted to the power supply apparatus.

According to yet another aspect of the embodiments, there is provided a method including performing wireless communication, wirelessly receiving power from a power supply apparatus, and controlling a predetermined level if data is transmitted to the power supply apparatus, wherein the predetermined level indicates a level of power used for transmitting data.

According to yet another aspect of the embodiments, there is provided non-transitory computer-readable recording medium storing a program which is executed by a computer and causes the computer to perform a method which includes performing wireless communication, wirelessly receiving power from a power supply apparatus, and controlling to limit a supply of power to a load unit if data is transmitted to the power supply apparatus.

According to yet another aspect of the embodiments, there is provided non-transitory computer-readable recording medium storing a program which is executed by a computer and causes the computer to perform a method which includes performing wireless communication, wirelessly receiving power from a power supply apparatus, and controlling a predetermined level if data is transmitted to the power supply apparatus, wherein the predetermined level indicates a level of power used for transmitting data.

Further features and aspects of the disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

DESCRIPTION OF THE EMBODIMENTS

Various exemplary embodiments, features, and aspects of the disclosure will be described in detail below with reference to the drawings. One disclosed feature of the embodiments may be described as a process which is usually depicted as a flowchart, a flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed. A process may correspond to a method, a program, a procedure, a method of manufacturing or fabrication, etc. One embodiment may be described by a schematic drawing depicting a physical structure. It is understood that the schematic drawing illustrates the basic concept and may not be scaled or depict the structure in exact proportions.

A communication system including an electronic apparatus according to a first exemplary embodiment is described in detail below with reference to the accompanying drawings.

Figure 1A:
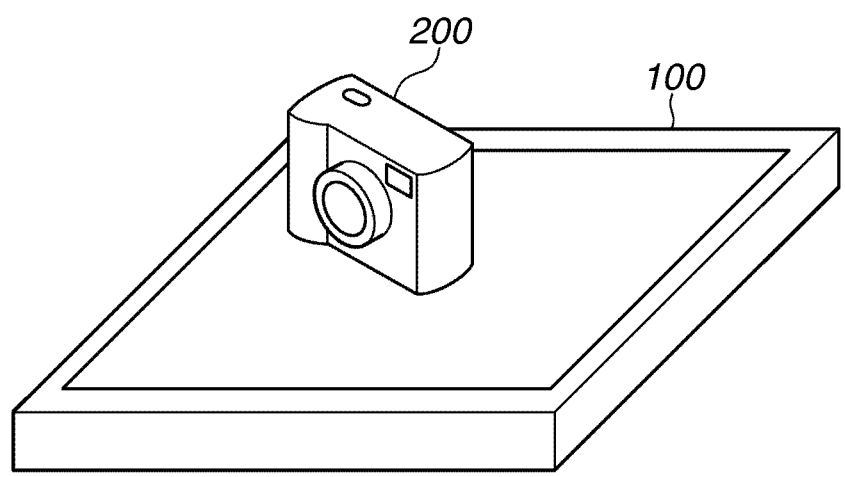
FIGS. 1A and 1B illustrate examples of communication systems according to a first exemplary embodiment.

A first communication system illustrated in FIG. 1A is described. The first communication system illustrated in FIG. 1A includes a power supply apparatus 100 and an electronic apparatus 200. In the first communication system illustrated in FIG. 1A, if a distance between the power supply apparatus 100 and the electronic apparatus 200 is within a first range, the electronic apparatus 200 may be wirelessly supplied with power from the power supply apparatus 100. At this point, the power supply apparatus 100 wirelessly supplies power to the electronic apparatus 200 via a power supply antenna included in the power supply apparatus 100 and the electronic apparatus 200 wirelessly receives power supplied from the power supply apparatus 100 via an antenna 201.

If a distance between the power supply apparatus 100 and the electronic apparatus 200 is within the first range, the electronic apparatus 200 may perform proximity wireless communication with the power supply apparatus 100 via the antenna 201. The term "first range" refers to a range from several centimeters to several tens of centimeters, for example. The power supply apparatus 100 and the electronic apparatus 200 perform the proximity wireless communication with each other to transfer authentication data for performing wireless power supply and control data for controlling the wireless power supply. The power supply apparatus 100 transmits data to the electronic apparatus 200 by the proximity wireless communication to allow normally supplying power to the electronic apparatus 200. If the electronic apparatus 200 receives data from the power supply apparatus 100 by the proximity wireless communication, the electronic apparatus 200 performs a specific operation and a specific process according to the data received from the power supply apparatus 100.

Figure 1B:
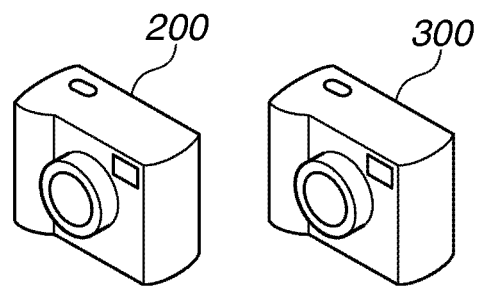

A second communication system illustrated in FIG. 1B is described below. The second communication system illustrated in FIG. 1B includes the electronic apparatus 200 and a communication apparatus 300. In the second communication system illustrated in FIG. 1B, if a distance between the communication apparatus 300 and the electronic apparatus 200 is within a second range, the electronic apparatus 200 performs proximity wireless communication with the communication apparatus 300 via the antenna 201. The term "second range" refers to a range from several centimeters to several tens of centimeters, for example.

The communication apparatus 300 and the electronic apparatus 200 perform the proximity wireless communication with each other to transfer authentication data for providing a specific service.

According to the first exemplary embodiment, the proximity wireless communication performed by the power supply apparatus 100 and the electronic apparatus 200 in a case where the distance between the power supply apparatus 100 and the electronic apparatus 200 is within the first range is regarded as communication conforming to the Near Field Communication (NFC) standard. The NFC standard is a standard that is prescribed by a Near Field Communication (NFC) forum.

According to the first exemplary embodiment, the proximity wireless communication performed by the electronic apparatus 200 and the communication apparatus 300 in a case where the distance between the electronic apparatus 200 and the communication apparatus 300 is within the second range is regarded as communication conforming to the NFC standard. The first range may be equal to or different from the second range.

The electronic apparatus 200 includes an NFC card emulation mode, a read/write mode, and a peer to peer mode as a communication mode.

The term "NFC card emulation mode" refers to a mode for using the function of an integrated circuit (IC) card by which a specific service may be provided such as electronic payment.

The term "read/write mode" refers to a mode for reading data from a device conforming to the NFC standard and writing data into the device conforming thereto.

The term "peer to peer mode" refers to a mode for authenticating communication performed between the apparatuses. The peer to peer mode is also a mode for transferring data related to settings of pairing of wireless local area network (LAN) or Bluetooth (registered trademark), for example.

If the communication mode of the electronic apparatus 200 is any one of the NFC card emulation mode, the read/write mode, and the peer to peer mode, the electronic apparatus 200 performs the proximity wireless communication with any one of the power supply apparatus 100 and the communication apparatus 300.

As is the case with the electronic apparatus 200, the power supply apparatus 100 and the communication apparatus 300 also include at least one of the NFC card emulation mode, the read/write mode, and the peer to peer mode. The power supply apparatus 100 and the communication apparatus 300 include means for performing the proximity wireless communication according to the NFC standard.

According to the first exemplary embodiment, the power supply apparatus 100 wirelessly supplies power to the electronic apparatus 200 using a magnetic resonance system. The electronic apparatus 200 receives power from the power supply apparatus 100 using the magnetic resonance system. The magnetic resonance system is a system that a magnetic field is resonated between the power supply apparatus 100 and the electronic apparatus 200.

One example of a configuration of the electronic apparatus 200 according to the first exemplary embodiment is described below with reference to FIG. 2. The following is described with a digital camera cited as an example of the electronic apparatus 200.

Figure 2:
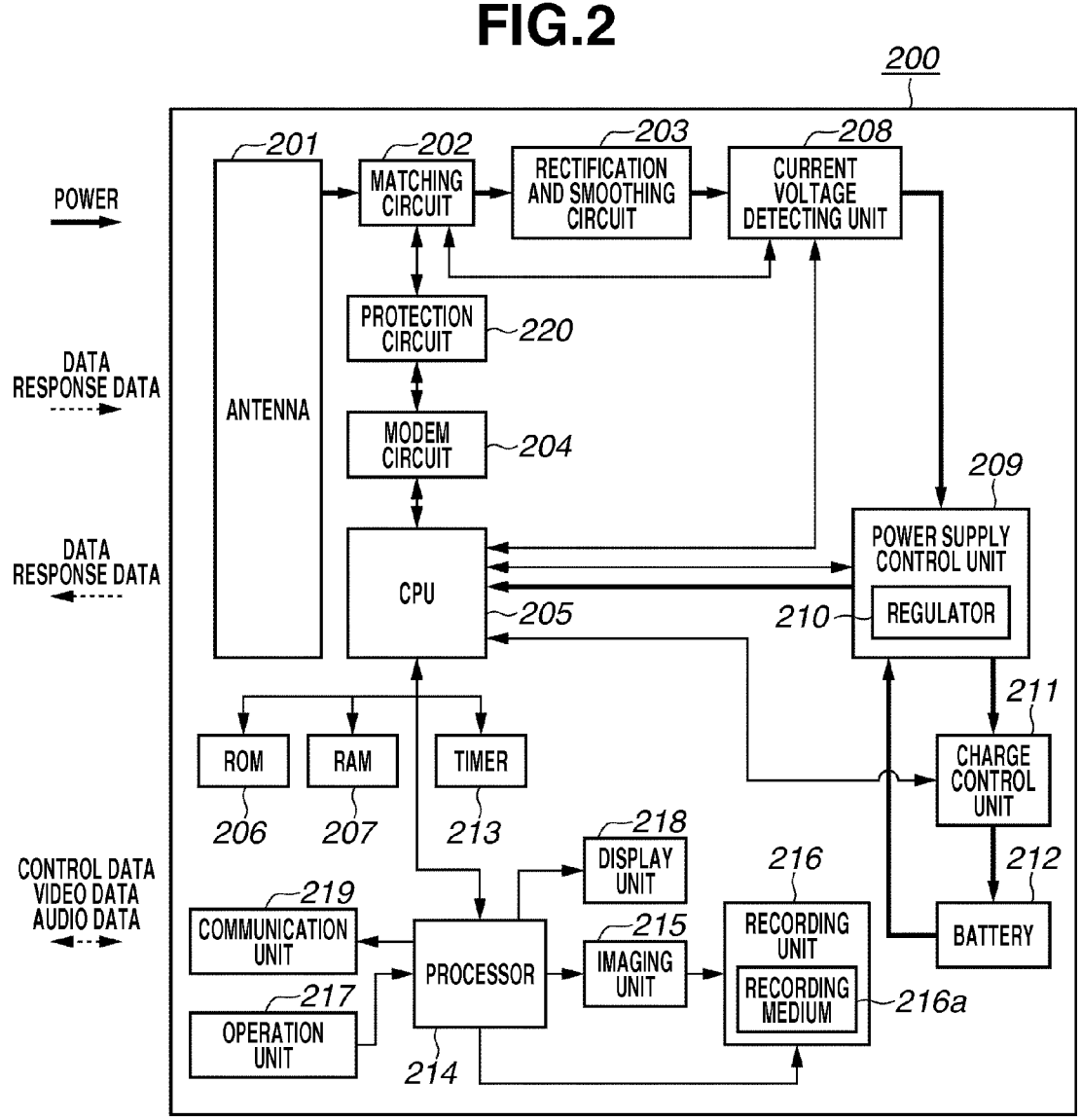
FIG. 2 is an example of a block configuration of an electronic apparatus according to the first exemplary embodiment.

As illustrated in FIG. 2, the electronic apparatus 200 includes an antenna 201, a matching circuit 202, a rectification and smoothing circuit 203, a modem circuit 204, a central processing unit (CPU) 205, a read only memory (ROM) 206, a random access memory (RAM) 207, a current voltage detecting unit 208, a power supply control unit 209, and a regulator 210. As illustrated in FIG. 2, the electronic apparatus 200 further includes a charge control unit 211, a battery 212, a timer 213, a processor 214, an imaging unit 215, a recording unit 216, a recording medium 216a, an operation unit 217, a display unit 218, a communication unit 219, and a protection circuit 220.

The antenna 201 is used for performing the proximity wireless communication with any one of the power supply apparatus 100 and the electronic apparatus 200. The antenna 201 also receives power supplied from the power supply apparatus 100.

If the communication mode of the electronic apparatus 200 is the NFC card emulation mode, the electronic apparatus 200 receives power from any one of the power supply apparatus 100 and the communication apparatus 300 via the antenna 201. The power received by the electronic apparatus 200 includes data. Accordingly, the electronic apparatus 200 may receive data from any one of the power supply apparatus 100 and the communication apparatus 300 by the proximity wireless communication. In this case, if the electronic apparatus 200 receives data from any one of the power supply apparatus 100 and the communication apparatus 300 via the antenna 201 by the proximity wireless communication, the electronic apparatus 200 outputs response data corresponding to the received data via the antenna 201. However, if the communication mode of the electronic apparatus 200 is the NFC card emulation mode, the electronic apparatus 200 may not spontaneously output power including data via the antenna 201 to one of the power supply apparatus 100 and the communication apparatus 300.

If the communication mode of the electronic apparatus 200 is the read/write mode, the electronic apparatus 200 outputs power including data via the antenna 201 to one of the power supply apparatus 100 and the communication apparatus 300. Accordingly, the electronic apparatus 200 may transmit data to any one of the power supply apparatus 100 and the communication apparatus 300 by the proximity wireless communication. In this case, if the electronic apparatus 200 transmits data to any one of the power supply apparatus 100 and the communication apparatus 300 via the antenna 201 by the proximity wireless communication, the electronic apparatus 200 receives response data corresponding to the transmitted data via the antenna 201. However, if the communication mode of the electronic apparatus 200 is the read/write mode, the electronic apparatus 200 may not receive power including data from any one of the power supply apparatus 100 and the communication apparatus 300 via the antenna 201.

If the communication mode of the electronic apparatus 200 is the peer to peer mode, the electronic apparatus 200 outputs power including data via the antenna 201 to any one of the power supply apparatus 100 and the communication apparatus 300. Accordingly, the electronic apparatus 200 may transmit data to any one of the power supply apparatus 100 and the communication apparatus 300 by the proximity wireless communication. If the communication mode of the electronic apparatus 200 is the peer to peer mode, the electronic apparatus 200 receives power including data from one of the power supply apparatus 100 and the communication apparatus 300 via the antenna 201. Accordingly, the electronic apparatus 200 may receive data from any one of the power supply apparatus 100 and the communication apparatus 300 by the proximity wireless communication.

Even if the communication mode of the electronic apparatus 200 is any one of the NFC card emulation mode and the peer to peer mode, the electronic apparatus 200 may receive power supplied from the power supply apparatus 100 via the antenna 201. If the communication mode of the electronic apparatus 200 is the read/write mode, the electronic apparatus 200 does not receive power supplied from the power supply apparatus 100 via the antenna 210. The antenna 210 is a loop antenna made of a coil, for example. The antenna 210 may be a helical antenna or a plane antenna such as a meander line antenna.

The matching circuit 202 is a resonant circuit for controlling a frequency f of the antenna 201 so that the power supply antenna of the power supply apparatus 100 resonates with the antenna 201. The matching circuit 202 is also a circuit for performing impedance matching. The matching circuit 202 includes a variable capacitor, a variable coil, a variable resistor, which are not illustrated, and the like.

The CPU 205 controls the matching circuit 202 so that the frequency of the power supply antenna matches the frequency f of the antenna 201 to cause the power supply antenna of the power supply apparatus 100 to resonate with the antenna 201.

The CPU 205 further performs control so that the frequency of the power supply antenna matches the frequency f of the antenna 201 by controlling values of the variable capacitor and the variable coil which are not illustrated and are included in the matching circuit 202.

The CPU 205 may perform control so that the frequency f of the antenna 201 becomes equal to the frequency of the commercial frequency 50/60 Hz so as to cause the power supply antenna of the power supply apparatus 100 to resonate with the antenna 201. Furthermore, the CPU 205 may perform control so that the frequency f of the antenna 201 becomes equal to about 13.56 MHz so as to cause the power supply antenna of the power supply apparatus 100 to resonate with the antenna 201.

The matching circuit 202 may detect change in current flowing into the antenna 201, and the matching circuit 202 may detect change in voltage supplied to the antenna 20.

In addition, the matching circuit 202 supplies the rectification and smoothing circuit 203 with power supplied from any one of the power supply apparatus 100 and the communication apparatus 300 via the antenna 201.

If the communication mode of the electronic apparatus 200 is any one of the NFC card emulation mode, the read/write mode, and the peer to peer mode, the CPU 205 controls the matching circuit 202 so that the frequency f of the antenna 201 becomes equal to 13.56 MHz. The frequency of 13.56 MHz conforms to the NFC standard.

The rectification and smoothing circuit 203 removes data and a noise from power supplied from the matching circuit 202 so as to generate a direct current (DC) power. The rectification and smoothing circuit 203 includes a diode, for example, for rectification and generates the DC power by any one of full wave rectification and half wave rectification.

The rectification and smoothing circuit 203 supplies the current voltage detecting unit 208 with the generated DC power. The generated DC power is generated using the power supplied from the matching circuit 202. The DC power generated by the rectification and smoothing circuit 203 is supplied to the power supply control unit 209 via the current voltage detecting unit 208. Data removed by the rectification and smoothing circuit 203 from the power is supplied to the modem circuit 204.

The modem circuit 204 is a circuit for performing the proximity wireless communication with any one of the power supply apparatus 100 and the communication apparatus 300 via the antenna 201 according to the NFC standard.

The modem circuit 204 analyzes the data supplied from the rectification and smoothing circuit 203 according to a communication protocol. The communication protocol conforms to the NFC standard. An analysis result of the data analyzed by the modem circuit 204 are supplied from the modem circuit 204 to the CPU 205. Accordingly, the electronic apparatus 200 may receive data from any one of the power supply apparatus 100 and the communication apparatus 300 by the proximity wireless communication via the antenna 201.

The modem circuit 204 detects response data corresponding to the data transmitted to any one of the power supply apparatus 100 and the communication apparatus 300 via the antenna 201 using change in the current detected by the matching circuit 202. The response data detected by the modem circuit 204 is supplied from the modem circuit 204 to the CPU 205. Accordingly, the electronic apparatus 200 may receive the response data corresponding to the data transmitted by the proximity wireless communication from any one of the power supply apparatus 100 and the communication apparatus 300 via the antenna 201.

The modem circuit 204 also performs amplitude shift keying (ASK) modulation to generate data for transmitting to any one of the power supply apparatus 100 and the communication apparatus 300 via the antenna 201. The modem circuit 204 superimposes the data generated according to the ASK modulation onto the power supplied from the power supply control unit 209 and supplies the data to the antenna 201 via the matching circuit 202. The power, including data generated according to the ASK modulation, supplied to the antenna 201 is supplied to any one of the power supply apparatus 100 and the communication apparatus 300 via the antenna 201. Accordingly, the electronic apparatus 200 may transmit data to any one of the power supply apparatus 100 and the communication apparatus 300 via the antenna 201 by the proximity wireless communication.

If the electronic apparatus 200 receives data from any one of the power supply apparatus 100 and the communication apparatus 300 via the antenna 201, the modem circuit 204 performs load modulation. Accordingly, the modem circuit 204 outputs response data corresponding to the data received by the electronic apparatus 200 via the matching circuit 202 and the antenna 201. Therefore, the electronic apparatus 200 may transmit the response data corresponding to the data received by the proximity wireless communication to any one of the power supply apparatus 100 and the communication apparatus 300 via the antenna 201. The load modulation is performed by the modem circuit 204 varying a load included in the modem circuit 204.

If the communication mode of the electronic apparatus 200 is the NFC card emulation mode, the modem circuit 204 performs a process for receiving the data supplied via the antenna 201 and a process for transmitting the response data corresponding to the received data via the antenna 201.

If the communication mode of the electronic apparatus 200 is the read/write mode, the modem circuit 204 performs a process for transmitting data via the antenna 201 and a process for receiving the response data corresponding to the transmitted data via the antenna 201.

If the communication mode of the electronic apparatus 200 is the peer to peer mode, the modem circuit 204 performs a process for receiving the data supplied via the antenna 201 and a process for transmitting data via the antenna 201.

The CPU 205 controls the electronic apparatus 200 according to a computer program recorded in the ROM 206. The CPU 205 also controls the electronic apparatus 200 according to the analysis result of data supplied from the modem circuit 204.

The ROM 206 stores a computer program for controlling the electronic apparatus 200 and information about parameters related to an operation and a process performed in the electronic apparatus 200. The ROM 206 records identification data of the electronic apparatus 200, device data of the electronic apparatus 200, display data, authentication data for performing communication corresponding to wireless local area network (LAN), and the like. The identification data of the electronic apparatus 200 includes data indicating the identification (ID) of the electronic apparatus 200. The device data of the electronic apparatus 200 includes data indicating the manufacturer's name, the apparatus name, the functions, and the power reception capacity of the electronic apparatus 200. The authentication data for performing communication corresponding to the wireless LAN includes at least one of data indicating service set identification (SSID) and data indicating extended SSID (ESSID), for example. The authentication data for performing communication corresponding to the wireless LAN may include data indicating media access control (MAC) address or data related to security.

Data about the power reception capacity includes data indicating power which the electronic apparatus 200 may receive from the power supply apparatus 100 and data indicating power required of the electronic apparatus 200 for charging the battery 212.

The RAM 207 is a rewritable nonvolatile memory. The RAM 207 temporarily records computer programs for controlling the electronic apparatus 200, data indicating parameters related to the operation and the process performed by the electronic apparatus 200, data acquired from any one of the power supply apparatus 100 and the communication apparatus 300, and the like. The RAM 207 also records data supplied from the modem circuit 204 to the CPU 205.

The current voltage detecting unit 208 detects current information indicating a current value of the DC power supplied from the rectification and smoothing circuit 203 and voltage information indicating a voltage value of the DC power supplied from the rectification and smoothing circuit 203. The current information and the voltage information detected by the current voltage detecting unit 208 are supplied to the CPU 205.

The CPU 205 controls the protection circuit 220 according to the current information and the voltage information supplied from the current voltage detecting unit 208. The CPU 205 calculates the power which the electronic apparatus 200 receives via the antenna 201 from the power supply apparatus 100 according to the current information and the voltage information supplied from the current voltage detecting unit 208. If it is detected that a voltage of the DC power supplied from the rectification and smoothing circuit 203 according to the voltage information detected by the current voltage detecting unit 208 is equal to or greater than a predetermined voltage, the CPU 205 may control the matching circuit 202 not so as to receive power from the power supply apparatus 100.

The power supply control unit 209 controls power supplied to each unit of the electronic apparatus 200. The power supply control unit 209 includes the regulator 210. The power supply control unit 209 is supplied with power from any one of the power supply apparatus 100, the battery 212, and an alternating current (AC) power supply (not illustrated). When the battery 212 is connected with the electronic apparatus 200, the power supply control unit 209 is supplied with power from the battery 212. When power is supplied from the power supply apparatus 100 via the antenna 201, the power supply control unit 209 is supplied with power from the power supply apparatus 100 via the antenna 201, the matching circuit 202, the rectification and smoothing circuit 203, and the current voltage detecting unit 208. When the AC power supply (not illustrated) is connected with the electronic apparatus 200, the power supply control unit 209 is supplied with power from the AC power supply (not illustrated).

The regulator 210 converts power supplied to the power supply control unit 209 from any one of the battery 212, the power supply apparatus 100, and the AC power supply to a voltage at an appropriate level and supplies the voltage to each unit of the electronic apparatus 200. The regulator 210 supplies power to each unit of the electronic apparatus 200 in accordance with an instruction from the CPU 205. The regulator 210 may be a switching regulator or a linear regulator. The regulator 210 may be formed of a plurality of regulator ICs so that power supplied to the power supply control unit 209 may be converted into voltages with a plurality of different levels and supplied to the electronic apparatus 200.

The charge control unit 211 charges the battery 212 if power is supplied from the regulator 210. The charge control unit 211 charges the battery 212 by a constant voltage and constant current method. Further, the charge control unit 211 periodically detects charge data related to the charge of the battery 212 and supplies the data to the CPU 205. The term "charge data" refers to data indicating the remaining capacity of the battery 212, data indicating charge current flowing into the battery 212, or data indicating a charge voltage supplied to the battery 212, for example. The charge data may include data indicating whether the battery 212 is quickly charged and data indicating whether the battery 212 is trickle-charged.

In the case where the battery 212 is not charged, the charge control unit 211 may detect a voltage and current discharged from the battery 212.

The CPU 205 detects whether the battery 212 is normally charged according to charge data supplied from the charge control unit 211.

The battery 212 is a battery detachable from the electronic apparatus 200. The battery 212 is a chargeable secondary battery such as a lithium ion battery, for example. When the battery 212 is connected to the electronic apparatus 200, the battery 212 supplies power to the power supply control unit 209.

The timer 213 measures current time and time related to an operation and a process performed in each unit. A threshold for the time measured by the timer 213 is previously recorded in the ROM 206.

The processor 214 controls at least one of the imaging unit 215 and the recording unit 216. The processor 214 controls at least one of the imaging unit 215 and the recording unit 216 according to a signal input via the operation unit 217. If the operation unit 217 is operated by a user, a signal corresponding to the operation performed for the operation unit 217 is input from the operation unit 217 to the processor 214. The processor 214 notifies the CPU 205 of the signal input from the operation unit 217. The CPU 205 controls the electronic apparatus 200 according to the signal input from the processor 214.

The imaging unit 215 includes an image sensor for generating video data from an optical image of an object, an image process circuit for subjecting the video data generated by the image sensor to an image process, and a compression/decompression circuit for compressing the video data and decompressing the compressed video data. The imaging unit 215 captures an image of an object and supplies the video data acquired by capturing the image to the recording unit 216. The recording unit 216 records the video data supplied from the imaging unit 215 in the recording medium 216a. The video data may include at least one of still image data and moving image data. The imaging unit 215 may further include an audio generation unit for generating audio data corresponding to the moving image data.

The recording unit 216 records data such as video data and audio data supplied from the imaging unit 215 in the recording medium 216a. The recording unit 216 records data such as video data and audio data received by the communication unit 219 in the recording medium 216a. In addition, the recording unit 216 supplies the video data and the audio data recorded in the recording medium 216a to the display unit 218 or an external display unit to reproduce contents thereof. The recording unit 216 reads the video data and the audio data to be transmitted to an external apparatus from the recording medium 216a and supplies the video data and the audio data to the communication unit 219.

The recording medium 216a may be a hard disk or memory card. Alternatively, the recording medium 216a may be a flash memory or a memory including a magnetic disk. Still alternatively, the recording medium 216a may be a recording medium incorporated in the electronic apparatus 200 or an external recording medium connectable to the electronic apparatus 200.

The operation unit 217 is a user interface for operating the electronic apparatus 200. The operation unit 217 includes a power source button for operating the electronic apparatus 200 and a mode switching button for switching the operation modes of the electronic apparatus 200. Each button is formed of a switch and a touch panel. If the operation unit 217 is operated by a user, the operation unit 217 supplies a signal corresponding to the operation performed by the user to at least one of the processor 214 and the CPU 205. The operation unit 217 may be a unit that controls the electronic apparatus 200 according to a remote control signal received from a remote controller (not illustrated).

The display unit 218 displays video data supplied from any one of the recording medium 216a, the RAM 207, and the ROM 206.

The communication unit 219 wirelessly communicates with any one of the power supply apparatus 100 and the communication apparatus 300 according to the IEEE 802.11a/b/g/n standard specified in the wireless LAN standard.

The communication unit 219 transmits video data, audio data, control data, and the like to any one of the power supply apparatus 100 and the communication apparatus 300 according to the wireless LAN standard. The communication unit 219 receives video data, audio data, control data, and the like from any one of the power supply apparatus 100 and the communication apparatus 300 according to the wireless LAN standard.

Even though the electronic apparatus 200 is performing the proximity wireless communication with any one of the power supply apparatus 100 and the communication apparatus 300 according to the NFC standard, the communication unit 219 may communicate with any one of the power supply apparatus 100 and the communication apparatus 300 according to the wireless LAN standard.

The protection circuit 220 is a circuit for protecting the modem circuit 204 from power which the electronic apparatus 200 receives from any one of the power supply apparatus 100 and the communication apparatus 300 via the antenna 201.

For example, if the electronic apparatus 200 is wirelessly supplied with power from the power supply apparatus 100, the power received from the power supply apparatus 100 via the antenna 201 is sometimes supplied to the modem circuit 204 via the matching circuit 202. If a power greater than the power for performing the proximity wireless communication is supplied from the power supply apparatus 100 to the electronic apparatus 200, a power greater than the power allowable for the modem circuit 204 may be supplied from the matching circuit 202 to the modem circuit 204. If the power greater than the power allowable for the modem circuit 204 is supplied to the modem circuit 204, the modem circuit 204 may be damaged and cause an issue that the electronic apparatus 200 may not normally perform the proximity wireless communication. The power for performing the proximity wireless communication is several tens of mW to 1 W or less, for example. In addition, the power for performing the proximity wireless communication is a power including data. If such an issue occurs, the power supply apparatus 100 fails in acquiring data for detecting the state of the electronic apparatus 200 from the electronic apparatus 200 and resultantly fails in normally controlling wirelessly supplying power to the electronic apparatus 200.

Figure 3:
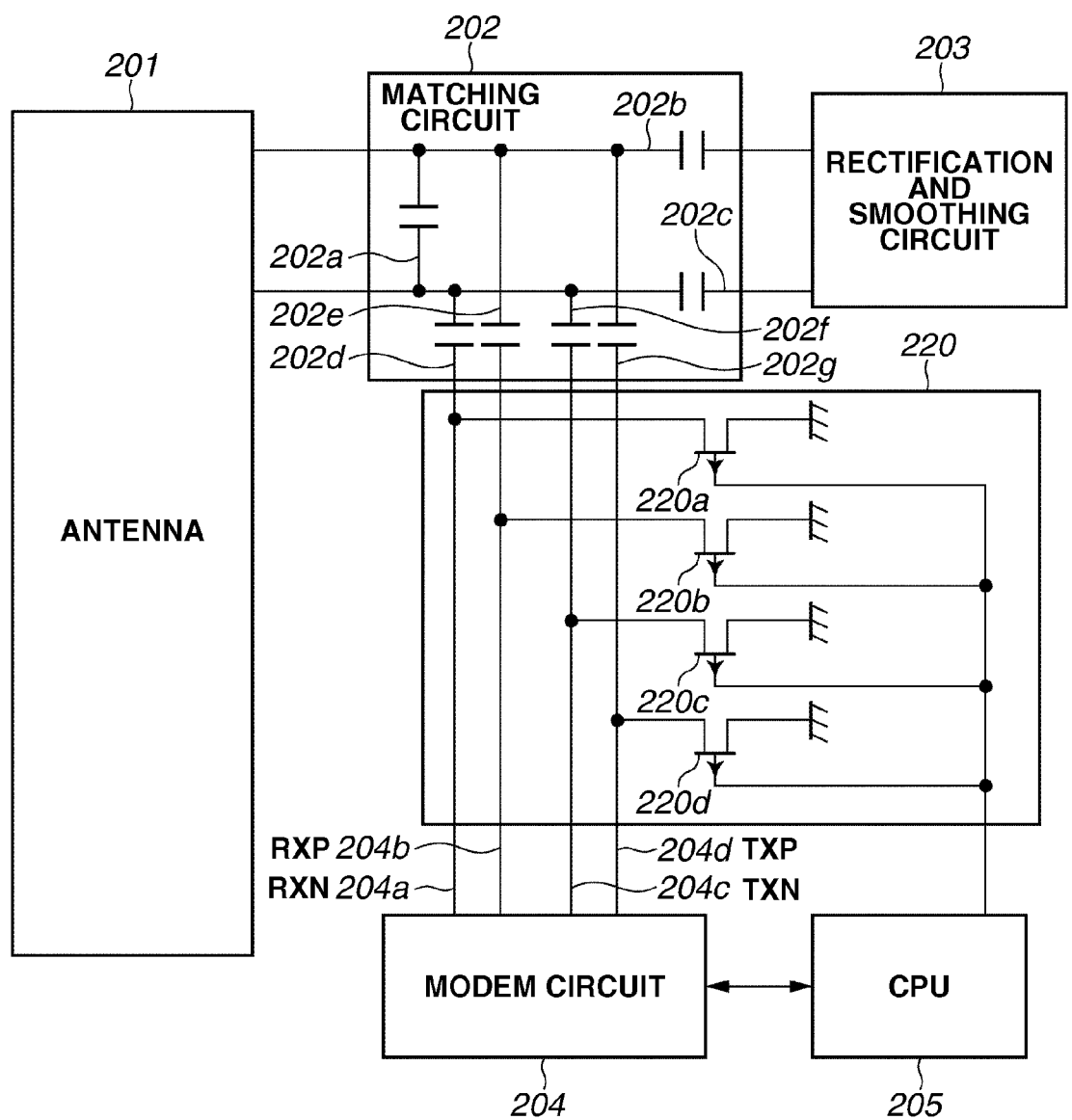
FIG. 3 illustrates an example of a protection circuit according to the first exemplary embodiment.

For the above reason, the electronic apparatus 200 according to the first exemplary embodiment is provided with the protection circuit 220 illustrated in FIG. 3. The protection circuit 220 is described below with reference to FIG. 3.

The matching circuit 202 includes capacitors for controlling a frequency f of the antenna 201, such as capacitors 202a, 202b, 202c, 202d, 202e, 202f, and 202g. The power supplied from the antenna 201 to the matching circuit 202 is supplied to the rectification and smoothing circuit 203 via the capacitors 202a, 202b, and 202c. The matching circuit 202 is connected with the modem circuit 204 via the capacitors 202d, 202e, 202f, and 202g. The capacitors 202d, 202e, 202f, and 202g are respectively connected with communication pins RXN 204a, RXP 204b, TXN 204c, and TXP 204d of the modem circuit 204.

The capacitor 202d is connected with the communication pin RXN 204a. The capacitor 202e is connected with the communication pin RXP 204b. The capacitor 202f is connected with the communication pin TXN 204c. The capacitor 202g is connected with the communication pin TXP 204d.

The communication pins TXP 204d and TXN 204c are used for outputting the power including data from the modem circuit 204 to the outside via the antenna 201.

The communication pins RXP 204b and RXN 204a are used for supplying data removed from the power received via the antenna 201 to the modem circuit 204. The communication pins RXP 204b and RXN 204a are also used for outputting response data corresponding to the data supplied to the modem circuit 204 via the antenna 201 to the outside via the antenna 201.

The protection circuit 220 is a circuit for protecting the modem circuit 204 from a power which is supplied via the capacitors 202d, 202e, 202f, and 202g. The protection circuit 220 controls not to supply a power from the antenna 201 to the modem circuit 204.

The protection circuit 220 includes field effect transistors (FET) 220a, 220b, 220c, and 220d. The CPU 205 controls at least one of gate voltages of the FETs 220a, 220b, 220c, and 220d.

One end of the FET 220a is connected between the capacitor 202d and the communication pin RXN 204a, and the other end of the FET 220a is connected with a ground (GND). One end of the FET 220b is connected between the capacitor 202e and the communication pin RXP 204b, and the other end of the FET 220b is connected with a ground (GND). One end of the FET 220c is connected between the capacitor 202f and the communication pin TXN 204c, and the other end of the FET 220c is connected with a ground (GND). One end of the FET 220d is connected between the capacitor 202g and the communication pin TXP 204d, and the other end of the FET 220d is connected with a ground (GND).

If the electronic apparatus 200 is wirelessly supplied with power from the power supply apparatus 100, the CPU 205 controls whether the FETs 220a, 220b, 220c, and 220d are turned on according to the gate voltages of the FETs 220a, 220b, 220c, and 220d.

Accordingly, the CPU 205 may protect the modem circuit 204 from the power which the electronic apparatus 200 receives from the power supply apparatus 100 via the antenna 201 by controlling the FETs 220a, 220b, 220c, and 220d.

If the modem circuit 204 is protected from the power which the electronic apparatus 200 receives from the power supply apparatus 100, the CPU 205 controls the FETs 220a, 220b, 220c, and 220d to cause the current supplied from the matching circuit 202 so as to flow to the GND. In this case, the CPU 205 controls the gate voltages of the FETs 220a, 220b, 220c, and 220d to turn on the FETs 220a, 220b, 220c, and 220d. In this case, the CPU 205 may prevent the current supplied from the matching circuit 202 from flowing to the communication pins RXN 204a, RXP 204b, TXN 204c, and TXP 204d. Accordingly, the CPU 205 controls the protection circuit 220 to protect the modem circuit 204 from the power which the electronic apparatus 200 receives from the power supply apparatus 100 via the antenna 201.

If the electronic apparatus 200 receives power for the proximity wireless communication from any one of the power supply apparatus 100 and the communication apparatus 300, the CPU 205 does not turn on the FETs 220a, 220b, 220c, and 220d. In this case, the CPU 205 causes the current supplied from the matching circuit 202 so as to flow to the modem circuit 204 via the communication pins RXN 204a and RXP 204b.

In addition to the configuration illustrated in FIG. 3, the protection circuit 220 may include an amplifier circuit for amplifying an output level of power for the proximity wireless communication output from the communication pins TXP 204d and TXN 204c. In addition to the configuration illustrated in FIG. 3, the protection circuit 220 may include an amplifier circuit which lowers voltage and current levels to be supplied to the communication pins RXP 204b and RXN 204a and then amplifying the received data. The protection circuit 220 may be a clipping circuit which clips the voltage of a Schottky barrier diode to a certain level or lower.

Figure 4:
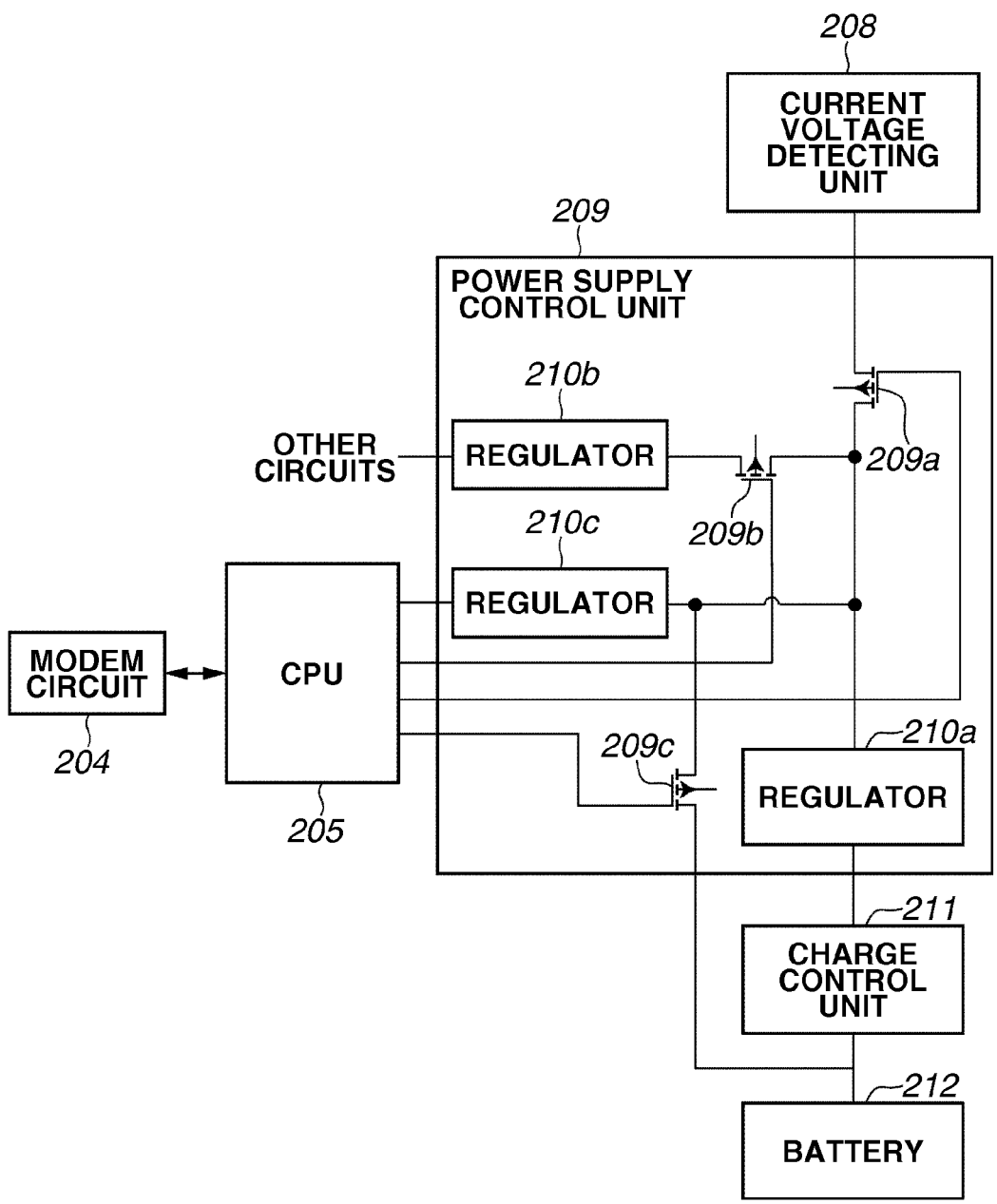
FIG. 4 illustrates an example of a power supply control unit according to the first exemplary embodiment.

The power supply control unit 209 of the electronic apparatus 200 according to the first exemplary embodiment has a configuration illustrated in FIG. 4.

If the electronic apparatus 200 transmits data by the proximity wireless communication to anyone of the power supply apparatus 100 and the communication apparatus 300, the modem circuit 204 supplies the power including data to the antenna 201 via the matching circuit 202. In this case, however, the power for the proximity wireless communication supplied from the modem circuit 204 to the matching circuit 202 is sometimes supplied to the power supply control unit 209 via the rectification and smoothing circuit 203. If the power for the proximity wireless communication supplied from the modem circuit 204 to the matching circuit 202 is supplied to the power supply control unit 209 via the rectification and smoothing circuit 203, the power for the proximity wireless communication to be supplied to the antenna 201 is decreased. In this case, for example, even if data is transmitted from the electronic apparatus 200 to the power supply apparatus 100 by the proximity wireless communication, the power supply apparatus 100 may not normally receive the data transmitted from the electronic apparatus 200. If data is transmitted from the electronic apparatus 200 also to the communication apparatus 300 by the proximity wireless communication, an issue similar to that occurs in the power supply apparatus 100 may occur. If such an issue occurs, the electronic apparatus 200 may not perform the proximity wireless communication with any one of the power supply apparatus 100 and the communication apparatus 300 to fail provide the user with a specific service.

Therefore, the electronic apparatus 200 according to the first exemplary embodiment includes the power supply control unit 209 whose configuration is illustrated in FIG. 4. One example of the configuration of the power supply control unit 209 is described with reference to FIG. 4.

The power supply control unit 209 includes regulators 210a, 210b, and 210c. The power supply control unit 209 further includes FETs 209a, 209b, and 209c. The CPU 205 controls the gate voltages of the FETs 209a, 209b, and 209c to control a destination to which the power supplied from the power supply control unit 209 is supplied. The regulator 210a is used for supplying the power from the power supply control unit 209 to the battery 212 and the charge control unit 211. The regulator 210c is used for supplying the power from the power supply control unit 209 to the modem circuit 204 and the CPU 205. The regulator 210b is used for supplying the power from the power supply control unit 209 to circuits other than the modem circuit 204, the CPU 205, the charge control unit 211, and the battery 212. The circuits other than the modem circuit 204, the CPU 205, the charge control unit 211, and the battery 212 may include at least one of the imaging unit 215, the recording unit 216, the display unit 218, and the communication unit 219, for example.

The CPU 205 controls the gate voltage of the FET 209a to control whether to turn on the FET 209a. The CPU 205 controls the gate voltage of the FET 209b to control whether to turn on the FET 209b. The CPU 205 controls the gate voltage of the FET 209c to control whether to turn on the FET 209c.

If the FET 209a is turned on, the power supplied from the power supply apparatus 100 to the power supply control unit 209 via the current voltage detecting unit 208 is supplied to the regulators 210c and 210a. If the FET 209a is turned off, the power supplied from the power supply apparatus 100 to the power supply control unit 209 via the current voltage detecting unit 208 is not supplied to the regulators 210c and 210a.

If the FET 209a is turned on and the FET 209b is turned on, the power supplied from the power supply apparatus 100 to the power supply control unit 209 via the current voltage detecting unit 208 is supplied to the regulator 210b. If the FET 209a is turned off or the FET 209b is turned off, the power supplied from the power supply apparatus 100 to the power supply control unit 209 via the current voltage detecting unit 208 is not supplied to the regulator 210b.

If the FET 209c is turned on, the power supplied from the battery 212 to the power supply control unit 209 is supplied to the regulators 210a and 210c. If the FET 209c is turned off, the power supplied from the battery 212 to the power supply control unit 209 is not supplied to the regulators 210a and 210c. In this case, even if the power supplied from the battery 212 to the power supply control unit 209 is supplied to the charge control unit 211 via the regulators 209c and 210a, the CPU 205 controls the charge control unit 211 not to charge the battery 212. Accordingly, the power discharged from the battery 212 may be prevented from being supplied to the battery 212.

If the FET 209c is turned on and the FET 209b is turned on, the power supplied from the battery 212 to the power supply control unit 209 is supplied to the regulator 210b. If the FET 209c is turned off or the FET 209b is turned off, the power supplied from the battery 212 to the power supply control unit 209 is not supplied to the regulator 210b.

The CPU 205 controls the FETs 209a, 209b, and 209c not to supply power for the proximity wireless communication, which is supplied from the modem circuit 204 to the matching circuit 202, to the power supply control unit 209 via the rectification and smoothing circuit 203.

The power supply control unit 209 may include an FET in addition to the configuration illustrated in FIG. 4. The power supply control unit 209 may include a circuit for regulating current or a switch instead of the FET in addition to the configuration illustrated in FIG. 4.

The electronic apparatus 200 may be an apparatus other than a digital still camera as long as the apparatus is operated by the power supplied from the battery 212. The electronic apparatus 200 may be an imaging apparatus such as a cellular phone with a camera, digital video camera, a smart phone, and so on, or a reproduction apparatus such as a player for reproducing audio data or video data. The electronic apparatus 200 may be a moving apparatus such as an automobile driven by power supplied from the battery 212.

The electronic apparatus 200 may be an electronic apparatus which may be operated by the power supplied from the power supply apparatus 100 even in a case where the battery is not attached.

The power supply apparatus 100 is described below. The power supply apparatus 100 includes a power supply antenna for wirelessly supplying power to the electronic apparatus 200 according to the magnetic resonance system and a resonance circuit for controlling the resonance frequency of the power supply antenna of the power supply apparatus 100. The power supply apparatus 100 further includes a proximity wireless communication unit for performing the proximity wireless communication with the electronic apparatus 200 according to the NFC standard, a power generation unit for generating power supplied to the electronic apparatus 200 via the power supply antenna, and a control unit for controlling the power supply apparatus 100. The power supply apparatus 100 performs the proximity wireless communication with the electronic apparatus 200 via the power supply antenna. If the power supply apparatus 100 performs the proximity wireless communication with the electronic apparatus 200, the power supply apparatus 100 controls the frequency of the power supply antenna using the resonance circuit to adjust the frequency to a frequency for the proximity wireless communication with the electronic apparatus 200.

The power supply apparatus 100 supplies any one of a first and a second power to the electronic apparatus 200.

The first power is a power generated by the power supply apparatus 100 to perform the proximity wireless communication between the power supply apparatus 100 and the electronic apparatus 200 according to the NFC standard. The first power is a power of 1 W or less. The first power is supplied from the power supply apparatus 100 to the electronic apparatus 200 in a case where the power supply apparatus 100 is in the read/write mode. The second power is a power generated by the power supply apparatus 100 to cause the electronic apparatus 200 to perform charge or a specific operation. The second power is greater than the first power. The second power is 1.5 W to 10 W, for example.

If the power supply apparatus 100 supplies the first power to the electronic apparatus 200, the power supply apparatus 100 controls the resonance circuit of the power supply apparatus 100 to adjust the frequency of the power supply antenna to 13.56 MHz. The second power is supplied from the power supply apparatus 100 to the electronic apparatus 200 during a period from the beginning to the end of power supply by the power supply apparatus 100. If the power supply apparatus 100 is supplying the second power to the electronic apparatus 200, it is assumed that the power supply apparatus 100 may not perform the proximity wireless communication with the electronic apparatus 200 according to the NFC standard.

The operation of the power supply apparatus 100 is described below.

If the power supply apparatus 100 wirelessly supplies power, the power supply apparatus 100 is bought into the read/write mode and performs authentication for starting supplying power by the proximity wireless communication with the electronic apparatus 200 before starting supplying the second power to the electronic apparatus 200. If the power supply apparatus 100 wirelessly supplies power, the power supply apparatus 100 transmits control data for controlling the electronic apparatus 200 to the electronic apparatus 200 by the proximity wireless communication. Hereinafter, the control data is referred to as a "command."

Thus, the power supply apparatus 100 transmits to the electronic apparatus 200 a first command for requesting the identification data of the electronic apparatus 200 and a second command for acquiring the device data of the electronic apparatus 200, while supplying the first power to the electronic apparatus 200.

If the power supply apparatus 100 does not acquire at least one of response data corresponding to the first command and response data corresponding to the second command from the electronic apparatus 200, the authentication for starting supplying power is not completed. In this case, the power supply apparatus 100 does not supply the second power to the electronic apparatus 200 until the authentication for starting supplying power is completed.

If the power supply apparatus 100 acquires the response data corresponding to the first command and the response data corresponding to the second command from the electronic apparatus 200, the authentication for starting supplying power is completed. In this case, the power supply apparatus 100 transmits a third command to the electronic apparatus 200 by the proximity wireless communication. The third command is used for notifying the electronic apparatus 200 of the start of supplying the second power to the electronic apparatus 200. If the power supply apparatus 100 acquires response data corresponding to the third command from the electronic apparatus 200, the power supply apparatus 100 supplies the second power to the electronic apparatus 200. At this point, the power supply apparatus 100 sets the value of the second power according to at least one of the response data corresponding to the first command and the response data corresponding to the second command.

If the power supply apparatus 100 supplies the second power to the electronic apparatus 200 for a certain period of time, the power supply apparatus 100 transmits a fourth command for acquiring status data of the electronic apparatus 200 to the electronic apparatus 200 by the proximity wireless communication in order to control the supply of power to the electronic apparatus 200. In this case, even if charging and a specific operation performed by the electronic apparatus 200 are not finished, the power supply apparatus 100 switches the power supplied to the electronic apparatus 200 from the second power to the first power and transmits the fourth command by the proximity wireless communication. If the power supply apparatus 100 acquires response data corresponding to the fourth command from the electronic apparatus 200, the power supply apparatus 100 determines whether to finish a process for supplying the second power to the electronic apparatus 200 according to the response data of the fourth command. For example, the power supply apparatus 100 may perform control so as to finish the process for supplying the second power to the electronic apparatus 200 by detecting whether charging by the electronic apparatus 200 is finished using the response data corresponding to the fourth command. In this case, if the power supply apparatus 100 detects that charging by the electronic apparatus 200 is finished, the power supply apparatus 100 performs control to finish the process for supplying the second power to the electronic apparatus 200. In this case, if the power supply apparatus 100 does not detect that charging by the electronic apparatus 200 is finished, the power supply apparatus 100 performs control so as not to finish the process for supplying the second power to the electronic apparatus 200.

If the power supply apparatus 100 finishes the process for supplying the second power to the electronic apparatus 200, the power supply apparatus 100 transmits a fifth command for notifying the electronic apparatus 200 that the supply of the second power is finished, to the electronic apparatus 200 by the proximity wireless communication. After that, the power supply apparatus 100 does not supply the first and the second power to the electronic apparatus 200.

If the power supply apparatus 100 does not finish the process for supplying the second power to the electronic apparatus 200, the power supply apparatus 100 sets the second power to be supplied to the electronic apparatus 200, switches the power supplied to the electronic apparatus 200 from the first power to the second power, and supplies again the second power to the electronic apparatus 200. At this point, the power supply apparatus 100 sets the value of the second power according to the response data of the fourth command. Then, the power supply apparatus 100 repeats the process for supplying the second power from the power supply apparatus 100 to the electronic apparatus 200 and the process for controlling the second power supplied to the electronic apparatus 200 using the fourth command until the supply of the second power is finished. Therefore, the power supply apparatus 100 alternately performs the process for supplying the second power to the electronic apparatus 200 and the process for supplying the first power to the electronic apparatus 200 until the fifth command is transmitted to the electronic apparatus 200 after the third command is transmitted to the electronic apparatus 200.

The power supply apparatus 100 and the electronic apparatus 200 may be the ones that correspond to a system excluding the magnetic resonance system.

For example, according to the first exemplary embodiment, the power supply apparatus 100 may the one that wirelessly supplies power to the electronic apparatus 200 by an electric field resonance system. In this case, the electronic apparatus 200 may be the one that receives power from the power supply apparatus 100 by the electric field resonance system. In this case, the power supply apparatus 100 has an electrode for supplying power and a resonance unit for resonating with the electronic apparatus 200. The electronic apparatus 200 also has an electrode for receiving power and a resonance unit for resonating with the power supply apparatus 100.

According to the first exemplary embodiment, the power supply apparatus 100 may be the one that wirelessly supplies power to the electronic apparatus 200 by electric field coupling. In this case, the electronic apparatus 200 may be the one that wirelessly receives power from the power supply apparatus 100 by the electric field coupling. In addition, in this case, the power supply apparatus 100 has an electrode for supplying power. The electronic apparatus 200 also has an electrode for receiving power.

In addition, the power supply apparatus 100 may be the one that wirelessly supplies power to the electronic apparatus 200 by electromagnetic induction. In this case, the electronic apparatus 200 may be the one that wirelessly receives power from the power supply apparatus 100 by the electromagnetic induction.

The power supply apparatus 100 may be the one that conforms to the standards specified by the Consumer Electronics Association (CEA). The electronic apparatus 200 may be the one that conforms to the standards specified by the CEA. The power supply apparatus 100 and the electronic apparatus 200 may be the ones that conform to any one of CEA-2042.4, CEA-2042.5, CEA-2042.5a, and CEA-2042.5b.

The power supply apparatus 100 may be an apparatus that conforms to the "Qi" standard. The electronic apparatus 200 may be an apparatus that conforms to the "Qi" standard.

According to the first exemplary embodiment, the power supply apparatus 100 wirelessly supplies power to the electronic apparatus 200 and the electronic apparatus 200 wirelessly receives power from the power supply apparatus 100. The term "wireless" may be expressed in different words as "noncontact" or "contactless."

The communication apparatus 300 is described below. The communication apparatus 300 includes an antenna for performing the proximity wireless communication with the electronic apparatus 200 according to the NFC standard, a resonance circuit for controlling the resonance frequency of the antenna of the communication apparatus 300, and a communication unit for performing wireless communication with the electronic apparatus 200. The communication apparatus 300 further includes a proximity wireless communication unit for performing the proximity wireless communication with the electronic apparatus 200 according to the NFC standard, a power generation unit for generating power supplied to the electronic apparatus 200 to perform the proximity wireless communication via the antenna according to the NFC standard, and a control unit for controlling the communication apparatus 300. If the communication apparatus 300 performs the proximity wireless communication with the electronic apparatus 200 according to the NFC standard, the communication apparatus 300 adjusts the frequency of the antenna of the communication apparatus 300 to the frequency for performing the proximity wireless communication with the electronic apparatus 200 using the resonance circuit. The communication unit of the communication apparatus 300 performs the proximity wireless communication with the electronic apparatus 200 according to the wireless LAN standard.

If the communication apparatus 300 performs the proximity wireless communication with the electronic apparatus 200 according to the NFC standard, the communication apparatus 300 supplies power for performing the proximity wireless communication to the electronic apparatus 200, and controls the resonance circuit of the communication apparatus 300 to adjust the frequency of the antenna of the communication apparatus 300 to 13.56 MHz.

The operation of the communication apparatus 300 is described below.

If the communication apparatus 300 performs wireless communication conforming to the wireless LAN standard, the communication apparatus 300 is in at least one of the read/write mode and the peer to peer mode. If the communication apparatus 300 performs wireless communication conforming to the wireless LAN standard, the communication apparatus 300 performs authentication for starting communication conforming to the wireless LAN standard. Therefore, the communication apparatus 300 transmits a sixth command for acquiring authentication data for a communication conforming to the wireless LAN standard to the electronic apparatus 200 while supplying the power for the proximity wireless communication to the electronic apparatus 200. In this case, the communication apparatus 300 acquires authentication data for a communication conforming to the wireless LAN standard by transmitting the sixth command according to the NFC standard.

If the communication apparatus 300 does not acquire response data of the sixth command from the electronic apparatus 200, authentication for starting communication conforming to the wireless LAN standard is not completed. In this case, the communication apparatus 300 neither transmits nor receives video data, audio data, and commands according to the wireless LAN standard until the authentication for starting communication conforming to the wireless LAN standard is completed.

If the communication apparatus 300 acquires the response data of the sixth command from the electronic apparatus 200, the authentication for starting communication conforming to the wireless LAN standard is completed. In this case, the communication apparatus 300 may transmit any one of the video data, the audio data, and the commands to the electronic apparatus 200 according to the wireless LAN standard. In addition, the communication apparatus 300 may receive any one of the video data, the audio data, and the commands from the electronic apparatus 200 according to the wireless LAN standard.

(Communication Process)

A communication process performed by the electronic apparatus 200 according to the first exemplary embodiment is described with reference to a flow chart in FIG. 5 (including FIGS. 5A and 5B).

Figure 5:
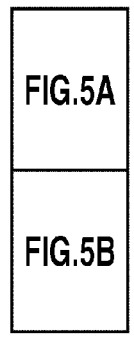
FIG. 5 (including FIGS. 5A and 5B) is a flow chart illustrating an example of a communication process performed by the electronic apparatus according to the first exemplary embodiment.
Figure 5A:
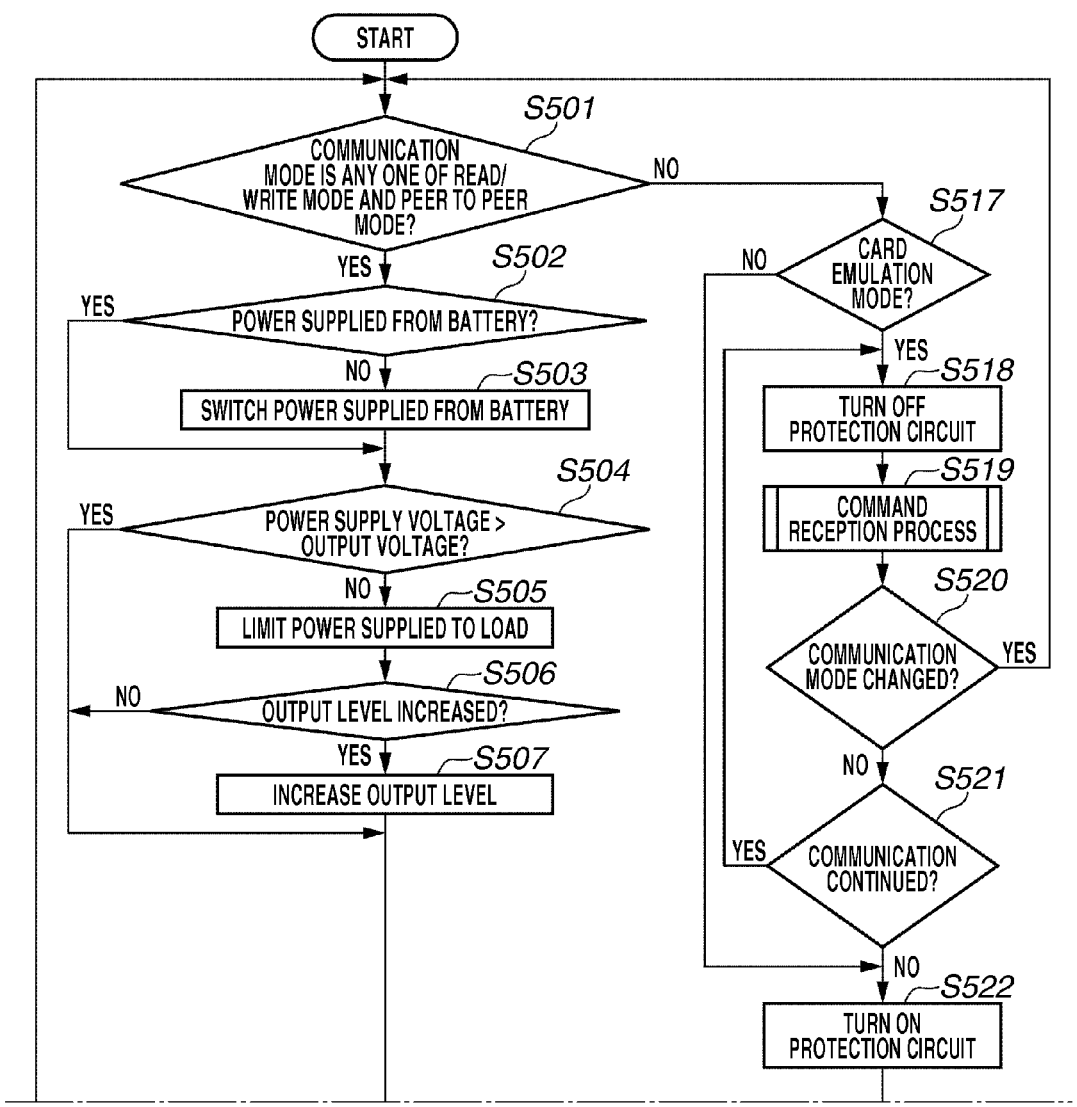
Figure 5B:
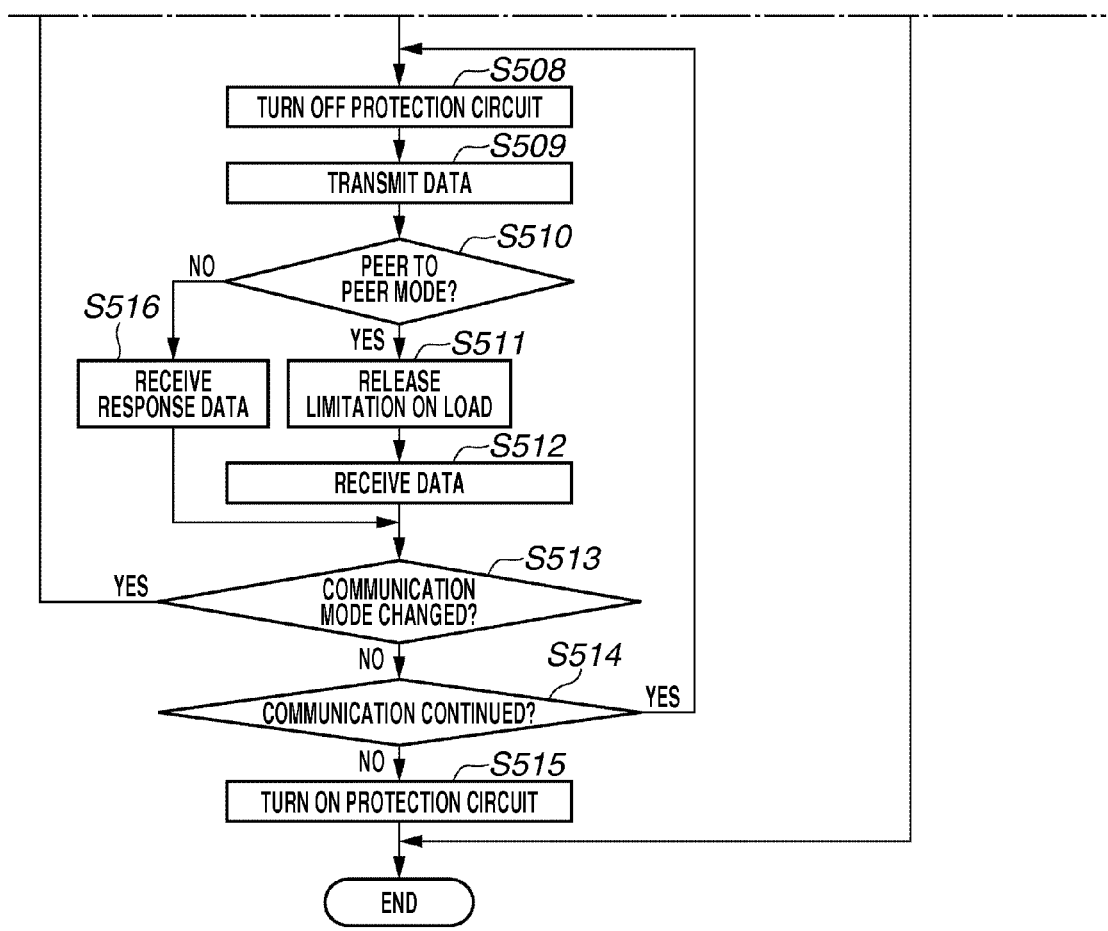

The communication process in FIG. 5 may be realized by the CPU 205 executing the computer programs stored in the ROM 206. The CPU 205 performs the communication process illustrated in FIG. 5 if the communication mode of the electronic apparatus 200 is set to any one of the NFC card emulation mode, the read/write mode, and the peer to peer mode.

In operation S501, the CPU 205 determines whether the communication mode of the electronic apparatus 200 is any one of the read/write mode and the peer to peer mode. If the CPU 205 determines that the communication mode of the electronic apparatus 200 is any one of the read/write mode and the peer to peer mode (YES in operation S501), the process in the process in the flow chart proceeds from operation S501 to operation S502. If the CPU 205 determines that the communication mode of the electronic apparatus 200 is the read/write mode (YES in operation S501), the process in the process in the flow chart proceeds from operation S501 to operation S502. If the CPU 205 determines that the communication mode of the electronic apparatus 200 is the peer to peer mode (YES in operation S501), the process in the process in the flow chart proceeds from operation S501 to operation S502. If the CPU 205 determines that the communication mode of the electronic apparatus 200 is neither the read/write mode nor the peer to peer mode (NO in operation S501), the process in the flow chart proceeds from operation S501 to operation S517.

In operation S502, the CPU 205 determines whether power discharged from the battery 212 is supplied to the power supply control unit 209. If the CPU 205 determines that the power discharged from the battery 212 is supplied to the power supply control unit 209 (YES in operation S502), the process in the flow chart proceeds from operation S502 to operation S504. If the CPU 205 determines that the power discharged from the battery 212 is not supplied to the power supply control unit 209 (NO in operation S502), the process in the flow chart proceeds from operation S502 to operation S503.

In operation S503, the CPU 205 controls the gate voltage of the FET 209c to turn on the FET 209c so that the CPU 205 and the modem circuit 204 are operated by using the power discharged from the battery 212. If the power discharged from the battery 212 is supplied to the CPU 205 and the modem circuit 204, the process in the flowchart proceeds from operation S503 to operation S504.

If the communication mode of the electronic apparatus 200 is any one of the read/write mode and the peer to peer mode, the modem circuit 204 superimposes data onto the power supplied from the battery 212. And the modem circuit 204 transmits the data to any one of the power supply apparatus 100 and the communication apparatus 300 via the antenna 201. In this case, the CPU 205 determines, using a power supply voltage of the battery 212 and a voltage of the power including data, whether or not the CPU 205 should perform a process for preventing the power including data from being supplied to the power supply control unit 209. The process for preventing the power including data from being supplied to the power supply control unit 209 is referred to as a "predetermined process." The voltage of the power including data is referred to as an "output voltage of the modem circuit 204." The power including data is output from the modem circuit 204.

In operation S504, the CPU 205 determines whether the power supply voltage of the battery 212 is greater than the output voltage of the modem circuit 204.

The power supply voltage of the battery 212 is a voltage of the power discharged from the battery 212 to the electronic apparatus 200. Information indicating the power supply voltage of the battery 212 may be the one of which the battery notifies the CPU 205 or which the charge control unit 211 detects. The output voltage of the modem circuit 204 may be detected by the current voltage detecting unit 208 or calculated from a register value for setting an output of the modem circuit 204.

If the CPU 205 determines that the power supply voltage of the battery 212 is greater than the output voltage of the modem circuit 204 (YES in operation S504), the process in the flow chart proceeds from operation S504 to operation S508. If the CPU 205 determines that the power supply voltage of the battery 212 is greater than the output voltage of the modem circuit 204 (YES in operation S504), the output voltage of the modem circuit 204 is supplied not to the power supply control unit 209 but to the antenna 201. In this case, the electronic apparatus 200 may transmit data to any one of the power supply apparatus 100 and the communication apparatus 300 via the antenna 201.

If the CPU 205 determines that the power supply voltage of the battery 212 is not greater than the output voltage of the modem circuit 204 (NO in operation S504), the process in the flow chart proceeds from operation S504 to operation S505. If the CPU 205 determines that the power supply voltage of the battery 212 is not greater than the output voltage of the modem circuit 204 (NO in operation S504), the output voltage of the modem circuit 204 is sometimes supplied not to the antenna 201 but to the power supply control unit 209. In this case, the electronic apparatus 200 may not transmit data to any one of the power supply apparatus 100 and the communication apparatus 300 via the antenna 201. If the power supply voltage of the battery 212 is not greater than the output voltage of the modem circuit 204 (NO in operation S504), the CPU 205 determines to perform the predetermined process.

In operation S505, the CPU 205 controls the power supply control unit 209 to limit the power supplied to the load of the electronic apparatus 200.

In this case, for example, the CPU 205 turns off the FET 209a so as not to connect the current voltage detecting unit 208 with the regulator 210a. In this case, the power supplied to the current voltage detecting unit 208 is not supplied from the power supply control unit 209 to the regulators 210a and 210c.

Further, for example, the CPU 205 turns off the FET 209b so as not to connect the current voltage detecting unit 208 with the regulator 210b. In this case, the power supplied to the current voltage detecting unit 208 is not supplied from the power supply control unit 209 to the regulator 210b.

Further, for example, the CPU 205 prevents the power supplied to the current voltage detecting unit 208 from being supplied to a circuit having a large load or a circuit having a large power consumption.

Thus, if the power supplied to the load of the electronic apparatus 200 is limited, the CPU 205 may prevent the power output from the modem circuit 204 from being supplied to the power supply control unit 209 even if the output voltage of the modem circuit 204 is equal to or greater than the power supply voltage of the battery 212. Accordingly, the electronic apparatus 200 may supply the power including data to the antenna 201 without supplying the power including data to the rectification and smoothing circuit 203.

If the power supplied to the load of the electronic apparatus 200 is limited by the CPU 205, the process in the flow chart proceeds from operation S505 to operation S506.

In operation S506, the CPU 205 determines whether or not the CPU 205 should control to increase the output level of the modem circuit 204.

If the output level of the modem circuit 204 is low and a part of the power including data is lowered, any one of the power supply apparatus 100 and the communication apparatus 300 may not receive data transmitted from the electronic apparatus 200. If the output level of the modem circuit 204 is high, any one of the power supply apparatus 100 and the communication apparatus 300 may receive data from the electronic apparatus 200, even if a part of the power including data is lowered.

Then, the CPU 205 determines whether or not the CPU 205 should control to increase the output level of the modem circuit 204 according to the state of power supplied to the load of the electronic apparatus 200.

If the CPU 205 determines that power is supplied to at least one of a circuit having a large load and a circuit consuming a large power, the CPU 205 determines that the CPU 205 should control to increase the output level of the modem circuit 204. If the CPU 205 determines that power is not supplied to either a circuit having a large load or a circuit having a large power consumption, the CPU 205 determines not that the CPU 204 should control to increase the output level of the modem circuit 204.

If the CPU 205 determines that the CPU 204 should control to increase the output level of the modem circuit 204 (YES in operation S506), the process in the flowchart proceeds from operation S506 to operation S507. If the CPU 205 determines not that the CPU 204 should control to increase the output level of the modem circuit 204 (NO in operation S506), the process in the flow chart proceeds from operation S506 to operation S508.

In operation S507, the CPU 205 sets a value of the register set to the modem circuit 204 greater than a present value to increase the output level of the modem circuit 204. In this case, the process in the flow chart proceeds from operation S507 to operation S508.

In operation S508, the CPU 205 turns off the protection circuit 220. In this case, the CPU 205 controls the gate voltages of the FETs 220a, 220b, 220c, and 220d to turn off the FETs 220a, 220b, 220c, and 220d. In this case, the current supplied from the matching circuit 202 flows not to the GND but to the modem circuit 204. Then, the process in the flow chart proceeds from operation S508 to operation S509.

In operation S509, the CPU 205 transmits data to any one of the power supply apparatus 100 and the communication apparatus 300. The CPU 205 controls the modem circuit 204 to convert the data into a modulation signal according to the ASK modulation. The CPU 205 further controls the modem circuit 204 to superimpose the converted modulation signal on the power supplied from the battery 212, and the modem circuit 204 transmits the converted modulation signal to any one of the power supply apparatus 100 and the communication apparatus 300 via the antenna 201. Then, the process in the flow chart proceeds from operation S509 to operation S510. For example, the data transmitted to any one of the power supply apparatus 100 and the communication apparatus 300 is a command for inquiring what apparatus is any one of the power supply apparatus 100 and the communication apparatus 300, or the like.

In operation S510, the CPU 205 determines whether the communication mode of the electronic apparatus 200 is the peer to peer mode. If the CPU 205 determines that the communication mode of the electronic apparatus 200 is the peer to peer mode (YES in operation S510), the process in the flowchart proceeds from operation S510 to operation S511. If the CPU 205 determines that the communication mode of the electronic apparatus 200 is not the peer to peer mode (NO in operation S510), the process in the flow chart proceeds from operation S510 to operation S516.

In operation S511, the CPU 205 releases the limitation of the power supplied to the load of the electronic apparatus 200 performed in operation S505. If the CPU 205 releases the process in operation S505, the process in the flow chart proceeds from operation S511 to operation S512. If the CPU 205 does not perform the process in operation S505, the CPU 205 may omit the process in operation S511.

In operation S512, the CPU 205 controls the modem circuit 204 to perform a process for receiving data from any one of the power supply apparatus 100 and the communication apparatus 300 via the antenna 201. The CPU 205 controls the electronic apparatus 200 according to an analysis result of data supplied from the modem circuit 204. Then, the process in the flow chart proceeds from operation S512 to operation S513.

In operation S513, the CPU 205 determines whether the communication mode of the electronic apparatus 200 is changed. If the CPU 205 determines that the communication mode of the electronic apparatus 200 is changed (YES in operation S513), the process in the process in the flow chart returns to operation S501 from operation S513. If the CPU 205 determines that the communication mode of the electronic apparatus 200 is not changed (NO in operation S513), the process in the flow chart proceeds from operation S513 to operation S514.

In operation S514, the CPU 205 determines whether the electronic apparatus 200 continues the proximity wireless communication according to the NFC standard. If the CPU 205 determines that the electronic apparatus 200 continues the wireless communication according to the NFC standard (YES in operation S514), the process in the flow chart returns to operation S508 from operation S514. If the CPU 205 determines not that the electronic apparatus 200 continues the proximity wireless communication according to the NFC standard (NO in operation S514), the process in the flow chart proceeds from operation S514 to operation S515.

If the proximity wireless communication according to the NFC standard is finished (NO in operation S514), the electronic apparatus 200 is probably supplied with the second power from the power supply apparatus 100. In this case, the modem circuit 204 needs to be protected from the power received from the power supply apparatus 100 via the antenna 201. In operation S515, therefore, the CPU 205 turns on the protection circuit 220. In this case, the CPU 205 controls the gate voltages of the FETs 220a, 220b, 220c, and 220d to turn on the FETs 220a, 220b, 220c, and 220d. In this case, the current supplied from the matching circuit 202 flows not to the modem circuit 204 but to the GND. Therefore, the electronic apparatus 200 may protect the modem circuit 204 from the power received via the antenna 201. Then, the process in the flow chart is ended.

In operation S516, the CPU 205 receives response data operation. The response data is related to the command transmitted to any one of the power supply apparatus 100 and the communication apparatus 300 in operation S509. In this case, the matching circuit 202 detects the current flowing to the antenna 201, and the CPU 205 controls the modem circuit 204 to receive the response data according to the detected current. In this case, the response data received from the modem circuit 204 is supplied to the CPU 205, and the CPU 205 controls the electronic apparatus 200 according to the response data supplied from the modem circuit 204. Then, the process in the flow chart proceeds from operation S516 to operation S513.

In operation S517, the CPU 205 determines whether the communication mode of the electronic apparatus 200 is the NFC card emulation mode. If the CPU 205 determines that the communication mode of the electronic apparatus 200 is the NFC card emulation mode (YES in operation S517), the process in the flow chart proceeds from operation S517 to operation S518. If the CPU 205 determines that the communication mode of the electronic apparatus 200 is not the NFC card emulation mode (NO in operation S517), the process in the flowchart proceeds from operation S517 to operation S522.

In operation S518, as is the case with operation S508, the CPU 205 turns off the protection circuit 220. In this case, the process in the flow chart proceeds from operation S518 to operation S519.

In operation S519, the CPU 205 performs a command reception process described below. If the CPU 205 performs the command reception process, the process in the flow chart proceeds from operation S519 to operation S520.

In operation S520, the CPU 205 determines whether the communication mode of the electronic apparatus 200 is changed. If the CPU 205 determines that the communication mode of the electronic apparatus 200 is changed (YES in operation S520), the process in the flow chart returns to operation S501 from operation S520. If the CPU 205 determines that the communication mode of the electronic apparatus 200 is not changed (NO in operation S520), the process in the flow chart proceeds from operation S520 to operation S521.

In operation S521, the CPU 205 determines whether the electronic apparatus 200 continues the proximity wireless communication according to the NFC standard. If the CPU 205 determines that the electronic apparatus 200 continues the proximity wireless communication according to the NFC standard (YES in operation S521), the process in the flow chart returns to operation S518 from operation S521. If the CPU 205 determines not that the electronic apparatus 200 continues the proximity wireless communication according to the NFC standard (NO in operation S521), the process in the flow chart proceeds from operation S521 to operation S522.

If the proximity wireless communication according to the NFC standard is finished (NO in operation S521), the electronic apparatus 200 is probably supplied with the second power from the power supply apparatus 100. In this case, the modem circuit 204 needs to be protected from the power received from the power supply apparatus 100 via the antenna 201. In operation S522, therefore, the CPU 205 turns on the protection circuit 220, as is the case with operation S515. In this case, the current supplied from the matching circuit 202 flows not to the modem circuit 204 but to the GND. Therefore, the electronic apparatus 200 may protect the modem circuit 204 from the power received via the antenna 201. Then, the process in the flow chart is ended.

(Command Reception Process)

According to the first exemplary embodiment, the command reception process performed by the electronic apparatus 200 in operation S519 for the communication process illustrated in FIG. 5 is described below with reference to a flow chart in FIG. 6. The command reception process may be realized by the CPU 205 executing the computer programs stored in the ROM 206. The command reception process in FIG. 6 may be performed at timing other than the process in operation S519 for the communication process in FIG. 5 as long as the communication mode of the electronic apparatus 200 is set to the NFC card emulation mode. The command reception process in FIG. 6 may be periodically performed by the CPU 205.

In operation S601, the CPU 205 determines whether the modem circuit 204 receives a command from any one of the power supply apparatus 100 and the communication apparatus 300 via the antenna 201. If the CPU 205 determines that the modem circuit 204 does not receive the command (NO in operation S601), the process in the flow chart is ended. If the CPU 205 determines that the modem circuit 204 receives the command (YES in operation S601), the process in the flowchart proceeds from operation S601 to operation S602.

In operation S602, the CPU 205 determines whether the command received by the modem circuit 204 is the first command from the analysis result supplied from the modem circuit 204. If the CPU 205 determines that the command received by the modem circuit 204 is not the first command (NO in operation S602), the process in the flow chart proceeds from operation S602 to operation S604. If the CPU 205 determines that the command received by the modem circuit 204 is the first command (YES in operation S602), the process in the flow chart proceeds from operation S602 to operation S603.

In operation S603, the CPU 205 controls the modem circuit 204 to perform the load modulation for transmitting the identification data of the electronic apparatus 200 to the power supply apparatus 100 as the response data corresponding to the first command. The identification data is information which the CPU 205 reads from the ROM 206. Then, the process in the flow chart is ended.

In operation S604, the CPU 205 determines whether the command received by the modem circuit 204 is the second command from the analysis result supplied from the modem circuit 204. If the CPU 205 determines that the command received by the modem circuit 204 is not the second command (NO in operation S604), the process in the flow chart proceeds from operation S604 to operation S606. If the CPU 205 determines that the command received by the modem circuit 204 is the second command (YES in operation S604), the process in the flowchart proceeds from operation S604 to operation S605.

In operation S605, the CPU 205 controls the modem circuit 204 to perform the load modulation for transmitting the device data to the power supply apparatus 100 as the response data corresponding to the second command. The device data is information which the CPU 205 reads from the ROM 206. Then, the process in the flow chart is ended.

In operation S606, the CPU 205 determines whether the command received by the modem circuit 204 is the third command from the analysis result supplied from the modem circuit 204. If the CPU 205 determines that the command received by the modem circuit 204 is not the third command (NO in operation S606), the process in the flow chart proceeds from operation S606 to operation S609. If the CPU 205 determines that the command received by the modem circuit 204 is the third command (YES in operation S606), the process in the flow chart proceeds from operation S606 to operation S607.

In operation S607, the CPU 205 starts charging the battery 212. In this case, the CPU 205 controls the gate voltage of the FET 209*a* to turn on the FET 209*a* and controls the charge control unit 211 to start charging the battery 212. Accordingly, if the second power is supplied to the electronic apparatus 200 from the power supply apparatus 100, the power received by the electronic apparatus 200 via the antenna 201 is supplied to the current voltage detecting unit 208 from the matching circuit 202 and the rectification and smoothing circuit 203. The current voltage detecting unit 208 supplies the power supplied from the matching circuit 202 and the rectification and smoothing circuit 203 to the regulator 210*a*, the charge control unit 211, and the battery 212 via the FET 209*a*. If the charge of the battery 212 is started, the process in the flow chart proceeds from operation S607 to operation S608.

In operation S608, the CPU 205 controls the modem circuit 204 to perform the load modulation for transmitting the response data corresponding to the third command to the power supply apparatus 100. If the response data corresponding to the third command is transmitted, as is the case with operation S515, the CPU 205 turns on the protection circuit 220 to perform control so that the modem circuit 204 is protected from the second power supplied from the power supply apparatus 100. Accordingly, even if the second power is supplied from the power supply apparatus 100 to the electronic apparatus 200, the CPU 204 may cause the current supplied from the matching circuit 202 may to flow to the GND. In this case, the current supplied from the matching circuit 202 is not flowing to the modem circuit 204. Therefore, even if the second power is supplied from the power supply apparatus 100 to the electronic apparatus 200, the modem circuit 204 is protected by the protection circuit 220. Then, the process in the flow chart is ended.

In operation S609, the CPU 205 determines whether the command received by the modem circuit 204 is the fourth command from the analysis result supplied from the modem circuit 204. If the CPU 205 determines that the command received by the modem circuit 204 is not the fourth command (NO in operation S609), the process in the flow chart proceeds from operation S609 to operation S612. If the CPU 205 determines that the command received by the modem circuit 204 is the fourth command (YES in operation S609), the process in the flowchart proceeds from operation S609 to operation S610.

In operation S610, the CPU 205 detects status data of the electronic apparatus 200. For example, the CPU 205 controls the charge control unit 211 to detect charging data of the battery 212 as status data. The detected status data is stored in the RAM 207. If the status data of the electronic apparatus 200 is detected, the process in the flow chart proceeds from operation S610 to operation S611.

In operation S611, the CPU 205 controls the modem circuit 204 to perform the load modulation for transmitting the status data to the power supply apparatus 100 as the response data corresponding to the fourth command. The status data is the data detected in operation S610. The status data may include operation information of the electronic apparatus 200 indicating the operation of the electronic apparatus 200 and power consumption information of the electronic apparatus 200 indicating the power consumption of the electronic apparatus 200. Then, the process in the flow chart is ended.

In operation S612, the CPU 205 determines whether the command received by the modem circuit 204 is the fifth command from the analysis result supplied from the modem circuit 204. If the CPU 205 determines that the command received by the modem circuit 204 is not the fifth command (NO in operation S612), the process in the flow chart proceeds from operation S612 to operation S615. If the CPU 205 determines that the command received by the modem circuit 204 is the fifth command (YES in operation S612), the process in the flow chart proceeds from operation S612 to operation S613.

In operation S613, the CPU 205 stops charging the battery 212. In this case, the CPU 205 controls the charge control unit 211 to stop charging the battery 212. Further, in this case, the CPU 205 may control the gate voltage of the FET 209a to turn off the FET 209a. If the charge of the battery 212 is stopped, the process in the flow chart proceeds from operation S613 to operation S614.

In operation S614, the CPU 205 controls the modem circuit 204 to perform the load modulation for transmitting the response data corresponding to the fifth command to the power supply apparatus 100. Then, the process in the flow chart is ended.

In operation S615, the CPU 205 determines whether the command received by the modem circuit 204 is the sixth command from the analysis result supplied from the modem circuit 204. If the CPU 205 determines that the command received by the modem circuit 204 is not the sixth command (NO in operation S615), the process in the flow chart is ended. If the CPU 205 determines that the command received by the modem circuit 204 is the sixth command (YES in operation S615), the process in the flow chart proceeds from operation S615 to operation S616.

In operation S616, the CPU 205 controls the modem circuit 204 to perform the load modulation for transmitting authentication data to the power supply apparatus 100 as the response data corresponding to the sixth command. The authentication data is information read by the CPU 205 from the ROM 206. Then, the process in the flow chart is ended.

As described above, the electronic apparatus 200 according to the first exemplary embodiment includes the protection circuit 220 for protecting the modem circuit 204. And the electronic apparatus 200 controls the protection circuit 220.

If the proximity wireless communication is performed by the electronic apparatus 200, the electronic apparatus 200 turns off the protection circuit 220. If the proximity wireless communication is not performed by the electronic apparatus 200, the electronic apparatus 200 turns on the protection circuit 220. Accordingly, even if power is wirelessly supplied from the power supply apparatus 100 to the electronic apparatus 200, the electronic apparatus 200 may protect the modem circuit 204 from the power received from the power supply apparatus 100.

Therefore, even if power is wirelessly supplied from the power supply apparatus 100 to the electronic apparatus 200, the electronic apparatus 200 according to the first exemplary embodiment is enabled to perform an appropriate wireless communication.

If the electronic apparatus 200 according to the first exemplary embodiment is in any one of the read/write mode and the peer to peer mode, the electronic apparatus 200 may prevent power for the proximity wireless communication from being supplied to the rectification and smoothing circuit 203 when data is transmitted by the proximity wireless communication. In this case, the electronic apparatus 200 may control the power for the proximity wireless communication to the outside by controlling the output level of the modem circuit 204.

Accordingly, the electronic apparatus 200 allows any one of the power supply apparatus 100 and the communication apparatus 300 to normally receive data from the electronic apparatus 200 by the proximity wireless communication.

Accordingly, the electronic apparatus 200 according to the first exemplary embodiment may appropriately perform wireless communication with external apparatuses.

In a second exemplary embodiment, portions common to those of the first exemplary embodiment are omitted from description. Only portions different from those of the first exemplary embodiment are described below.

Figure 7:
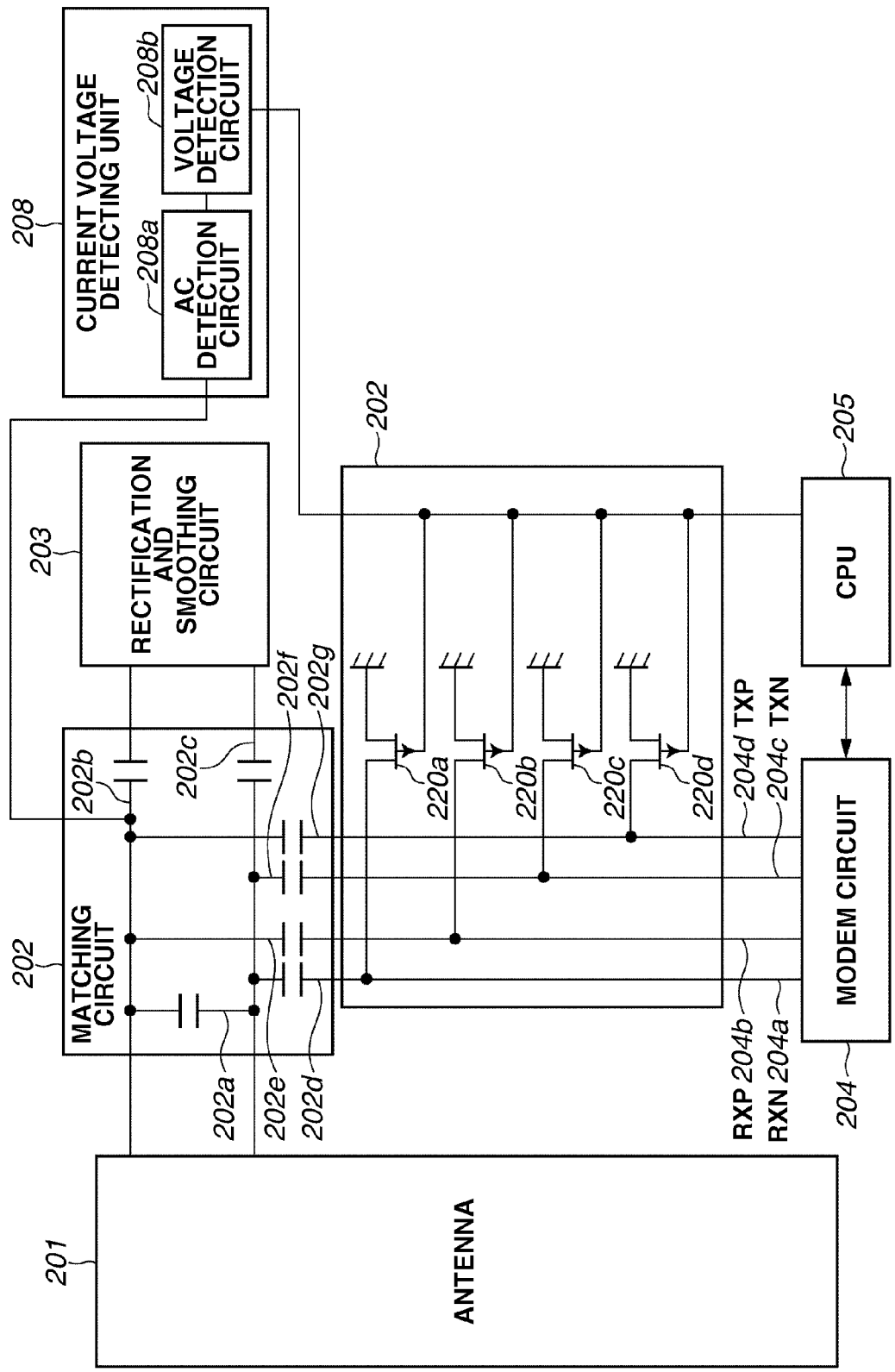
FIG. 7 illustrates an example of a protection circuit according to a second exemplary embodiment.

The electronic apparatus 200 according to the second exemplary embodiment includes the protection circuit 220 illustrated in FIG. 7.

The current voltage detecting unit 208 according to the second exemplary embodiment includes an alternating current (AC) detection circuit 208a and a voltage detection circuit 208b.

The AC detection circuit 208a may use a detection circuit including a diode, for example. The AC detection circuit 208a is connected with a capacitor 202a and the AC detection circuit 208a is connected with a capacitor 202b. The AC detection circuit 208a detects an alternating current (AC) voltage of the power supplied from the power supply apparatus 100 to the matching circuit 202 via the antenna 201. A voltage signal detected by the AC detection circuit 208a is supplied to the voltage detection circuit 208b. The voltage detection circuit 208b detects whether the voltage of the power supplied from the power supply apparatus 100 to the matching circuit 202 is equal to or greater than a predetermined voltage. Further, the voltage detection circuit 208b may control the gate voltages of the FETs 220a, 220b, 220c, and 220d.

If the voltage of the power supplied from the power supply apparatus 100 to the matching circuit 202 does not exceed the predetermined voltage, the voltage detection circuit 208b does not turn on the FETs 220a, 220b, 220c, and 220d. In this case, the current supplied from the matching circuit 202 does not flow to the GND via at least one of the FETs 220a, 220b, 220c, and 220d.

If the voltage of the power supplied from the power supply apparatus 100 to the matching circuit 202 is equal to or greater than the predetermined voltage, the voltage detection circuit 208b turns on the FETs 220a, 220b, 220c, and 220d. In this case, the current supplied from the matching circuit 202 flows to the GND. In this case, the voltage detection circuit 208b may prevent the current supplied from the matching circuit 202 from flowing to the communication pins RXN 204a, RXP 204b, TXN 204c, and TXP 204d. Accordingly, if the voltage of the power supplied from the power supply apparatus 100 via the antenna 201 is equal to or greater than the predetermined voltage, the voltage detection circuit 208b may protect the modem circuit 204 by controlling the protection circuit 220. The voltage detection circuit 208b may perform control to protect the modem circuit 204 from the power supplied from the power supply apparatus 100 according to the power received from the power supply apparatus 100.

Figure 6:
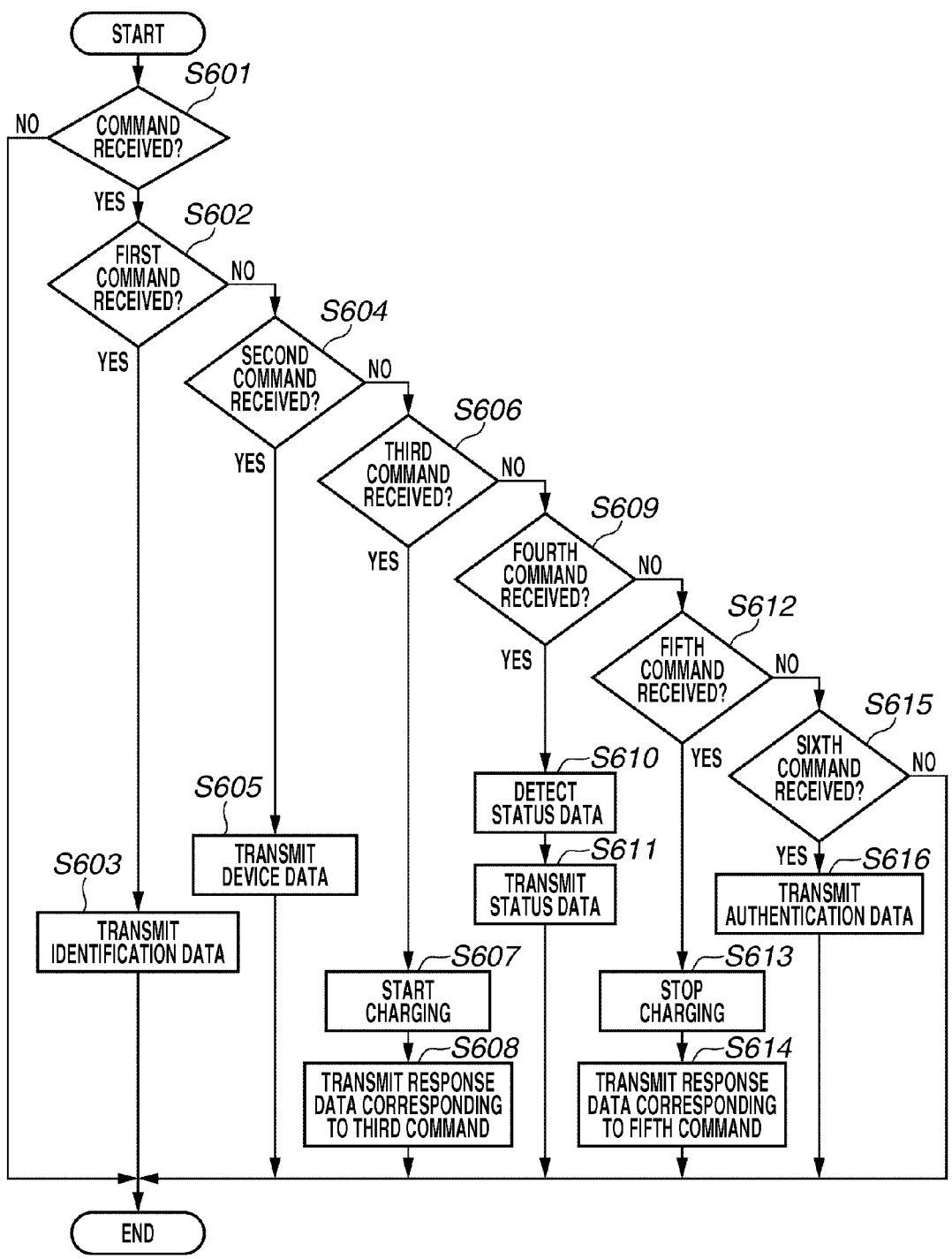
FIG. 6 is a flow chart illustrating an example of a command reception process performed by the electronic apparatus according to the first exemplary embodiment.

If the communication process in FIG. 5 and the command reception process in FIG. 6 are performed by the electronic apparatus 200 according to the second exemplary embodiment, the protection circuit 220 controlled by the CPU 205 is automatically performed by the AC detection circuit 208a and the voltage detection circuit 208b.

The CPU 205 sets a predetermined voltage which is a threshold of the voltage detection circuit 208b. In this case, the CPU 205 sets the value of the predetermined voltage to protect the modem circuit 204 by turning on the protection circuit 220 when the power larger than the first power is supplied from the power supply apparatus 100. Accordingly, if the second power is supplied from the power supply apparatus 100 to the electronic apparatus 200, the voltage detection circuit 208b turns on the protection circuit 220 to prevent the current from flowing to the modem circuit 204. If the first power is supplied from the power supply apparatus 100 to the electronic apparatus 200, the voltage detection circuit 208b turns off the protection circuit 220 to supply the current from the matching circuit 202 to the modem circuit 204.

As described above, the electronic apparatus 200 according to the second exemplary embodiment may control to protect the modem circuit 204 from the power received from the power supply apparatus 100 based on the magnitude of the power received from the power supply apparatus 100.

Further, the electronic apparatus 200 according to the second exemplary embodiment includes the configuration common to the first exemplary embodiment other than the configuration of the protection circuit 220 and a process regarding the protection circuit 220, and performs a process common to the first exemplary embodiment. Accordingly, the electronic apparatus 200 according to the second exemplary embodiment may acquire effects and benefits similar to those in the first exemplary embodiment.

Figure 8:
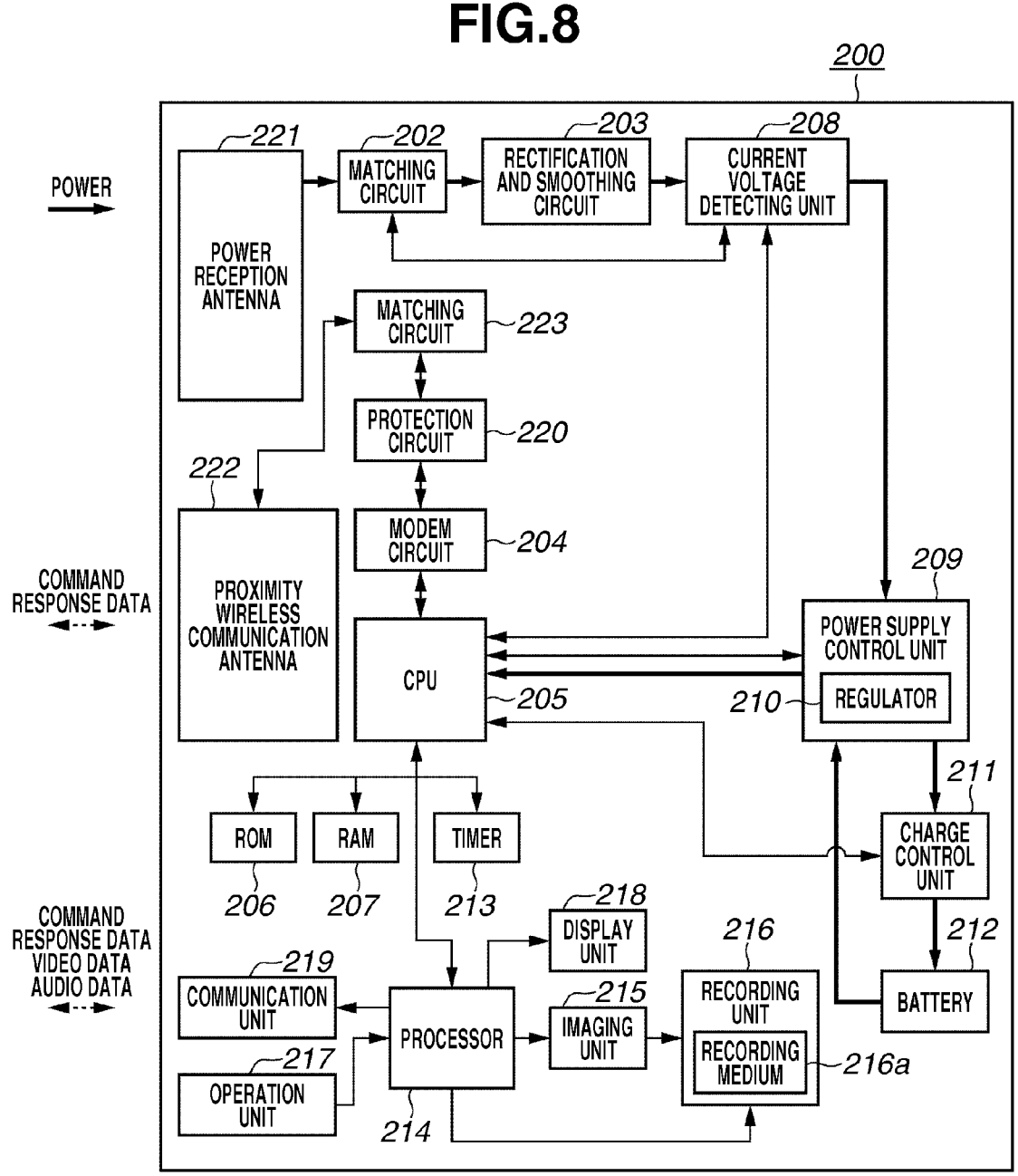
FIG. 8 illustrates an example of a block configuration of an electronic apparatus according to a third exemplary embodiment.

A third exemplary embodiment is described below with reference to FIG. 8. According to the first and second exemplary embodiments, the antenna 201 plays both roles of an antenna for the electronic apparatus 200 receiving power from the power supply apparatus 100 and an antenna for performing the proximity wireless communication.

The electronic apparatus 200 according to the third exemplary embodiment includes a power receiving antenna 221 and a proximity wireless communication antenna 222 instead of the antenna 201. The electronic apparatus 200 according to the third exemplary embodiment further includes a matching circuit 223. In the electronic apparatus 200 according to the third exemplary embodiment, the matching circuit 202 is not connected with the modem circuit 204, but the matching circuit 223 is connected with the modem circuit 204.

The power receiving antenna 221 is an antenna for receiving power wirelessly supplied from the power supply apparatus 100. The power receiving antenna 221 may be a loop antenna, a helical antenna, or a meander line antenna, for example. The power supplied from the power supply apparatus 100 is supplied to the power supply control unit 209 via the matching circuit 202, the rectification and smoothing circuit 203, and the current voltage detecting unit 208.

The proximity wireless communication antenna 222 is an antenna for performing the proximity wireless communication according to the NFC standard with any one of the power supply apparatus 100 and the communication apparatus 300. The receiving antenna 221 may be a loop antenna, for example.

The electronic apparatus 200 performs the proximity wireless communication with any one of the power supply apparatus 100 and the communication apparatus 300 via the proximity wireless communication antenna 222.

The matching circuit 223 is a resonance circuit for controlling the frequency of the proximity wireless communication antenna 222 to perform the proximity wireless communication with any one of the power supply apparatus 100 and the communication apparatus 300 according to the NFC standard.

If the electronic apparatus 200 performs the proximity wireless communication with any one of the power supply apparatus 100 and the communication apparatus 300, the CPU 205 controls the matching circuit 223 to adjust the frequency of the proximity wireless communication antenna 222 to 13.56 MHz.

The matching circuit 202 according to the third exemplary embodiment is a resonance circuit for controlling the frequency of the power receiving antenna 221. The matching circuit 202 according to the third exemplary embodiment does not perform the proximity wireless communication conforming to the NFC standard.

If the electronic apparatus 200 receives the power supplied from the power supply apparatus 100 via the power receiving antenna 221, the CPU 205 controls the matching circuit 202 so that the frequency of the power receiving antenna 221 agrees with the resonance frequency of the power supply antenna of the power supply apparatus 100. In this case, the CPU 205 may control the matching circuit 202 so that the frequency of the power receiving antenna 221 is made different from the frequency of the proximity wireless communication antenna 222. Further, in this case, the CPU 205 may control the matching circuit 202 so that the frequency of the power receiving antenna 221 coincides with the frequency of the proximity wireless communication antenna 222.

It is assumed that the electronic apparatus 200 according to the third exemplary embodiment does not perform the proximity wireless communication with any one of the power supply apparatus 100 and the communication apparatus 300 via the power receiving antenna 221.

The modem circuit 204 performs the proximity wireless communication with any one of the power supply apparatus 100 and the communication apparatus 300 via the proximity wireless communication antenna 222 according to the NFC standard.

If the electronic apparatus 200 according to the third exemplary embodiment transmits data to any one of the power supply apparatus 100 and the communication apparatus 300 via the proximity wireless communication antenna 222, power including the data is output from the proximity wireless communication antenna 222. In this case, the power receiving antenna 221 sometimes receives the power including data output from the proximity wireless communication antenna 222. Therefore, any one of the power supply apparatus 100 and the communication apparatus 300 may not be able to normally receive the data transmitted from the electronic apparatus 200 by the proximity wireless communication.

To prevent such a situation, the electronic apparatus 200 according to the third exemplary embodiment performs the communication process in FIG. 5, as is the case with the first exemplary embodiment. Accordingly, the electronic apparatus 200 according to the third exemplary embodiment may prevent the power receiving antenna 221 from receiving the power output from the proximity wireless communication antenna 222.

If the electronic apparatus 200 according to the third exemplary embodiment receives power from the power supply apparatus 100 via the power receiving antenna 221, the proximity wireless communication antenna 222 sometimes receives the power supplied from the power supply apparatus 100 to the electronic apparatus 200. Therefore, there is a possibility that the power supplied from the power supply apparatus 100 is supplied to the modem circuit 204 via the proximity wireless communication antenna 222.

To prevent such a situation, the electronic apparatus 200 according to the third exemplary embodiment performs the communication process in FIG. 5, as is the case with the first exemplary embodiment. Accordingly, the electronic apparatus 200 according to the third exemplary embodiment may protect the modem circuit 204 from the power supplied from the power supply apparatus 100 even if power is wirelessly supplied from the power supply apparatus 100 to the electronic apparatus 200.

The electronic apparatus 200 according to the third exemplary embodiment includes the configuration common to the first exemplary embodiment other than the configuration of the power receiving antenna 221 and the proximity wireless communication antenna 222 and a process regarding the matching circuit 223. Therefore, the electronic apparatus 200 according to the third exemplary embodiment may acquire effects and benefits similar to those in the first exemplary embodiment.

The protection circuit 220 of the electronic apparatus 200 according to the third exemplary embodiment may include a configuration similar to that in the first exemplary embodiment or that in the second exemplary embodiment. Therefore, if the protection circuit 220 of the electronic apparatus 200 according to the third exemplary embodiment includes the configuration similar to that of the electronic apparatus 200 in the first exemplary embodiment, the electronic apparatus 200 according to the third exemplary embodiment may acquire effects and benefits similar to those in the first exemplary embodiment. If the protection circuit 220 of the electronic apparatus 200 according to the third exemplary embodiment includes the configuration similar to that of the electronic apparatus 200 according to the second exemplary embodiment, the electronic apparatus 200 according to the third exemplary embodiment may acquire effects and benefits similar to those according to the second exemplary embodiment.

In the first, second, and third exemplary embodiments, the above description is made on the assumption that the electronic apparatus 200 performs the proximity wireless communication with any one of the power supply apparatus 100 and the communication apparatus 300 according to the NFC standard. However, the exemplary embodiments are not limited to the above assumption.

For example, the electronic apparatus 200 may perform the proximity wireless communication with any one of the power supply apparatus 100 and the communication apparatus 300 according to the International Organization for Standardization/International Electrotechnical Commission (ISO/IEC) 18092 standard. Further, the electronic apparatus 200 may perform the proximity wireless communication with any one of the power supply apparatus 100 and the communication apparatus 300 according to the ISO/IEC 14443 standard.

Alternatively, the electronic apparatus 200 may perform the proximity wireless communication with any one of the power supply apparatus 100 and the communication apparatus 300 according to a protocol corresponding to the radio frequency identification (RFID).

Still alternatively, the electronic apparatus 200 may perform the proximity wireless communication with any one of the power supply apparatus 100 and the communication apparatus 300 according to a protocol corresponding to the Mikron Fare-collection System (MIFARE) (registered trademark).

Further still alternatively, the electronic apparatus 200 may perform the proximity wireless communication with any one of the power supply apparatus 100 and the communication apparatus 300 according to a protocol corresponding to a Felica (registered trademark).

Further still alternatively, the electronic apparatus 200 may perform the proximity wireless communication with any one of the power supply apparatus 100 and the communication apparatus 300 according to a standard corresponding to the TransferJet technology. If the electronic apparatus 200 may perform the proximity wireless communication according to the standard corresponding to the TransferJet technology, the frequency for performing the proximity wireless communication may be the one excluding 13.56 MHz. The frequency for performing the proximity wireless communication may be 6.78 MHz or a frequency of several hundred KHz.

The term "proximity wireless communication" may be expressed in different words as "near field communication" or "wireless communication."

The electronic apparatus 200 is not limited to the electronic apparatus 200 described in the first, second, and third exemplary embodiments. For example, the electronic apparatus 200 may be realized by a system including a plurality of apparatuses. The power supply apparatus 100 and the communication apparatus 300 are not limited to the power supply apparatus 100 and the communication apparatus 300 described in the first, second, and third exemplary embodiments. For example, the power supply apparatus 100 and the communication apparatus 300 may be realized by a system including a plurality of apparatuses.

The various processes and functions described in the first, second, and third exemplary embodiments may be realized by one or more computer programs. In this case, the computer program may be executed by a computer (including a central processing unit (CPU)) to realize or perform various functions or operations described in the first, second, and third exemplary embodiments.

It is to be understood that the computer program may realize or perform the various processes and functions or operations described in the first, second, and third exemplary embodiments using an operating system (OS) operated on a computer.

The computer program may be read from a computer readable recording medium and executed by a computer or a processor. A hard disk device, an optical disk, a compact disk read-only-memory (CD-ROM), a compact-disk readable (CD-R), a memory card, and a ROM may be used as the computer readable recording medium. The computer program may be provided for the computer or the processor from an external apparatus via a communication interface and executed by the computer or the processor.

While the disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

This application claims priority from Japanese Patent Application No. 2011-265893 filed Dec. 5, 2011, which is hereby incorporated by reference herein in its entirety.

What is claimed is:

1. An electronic apparatus comprising:
a communication unit that performs wireless communication;
a load unit;
a power receiving unit that wirelessly receives power from a power supply apparatus; and
a control unit that controls to limit a supply of power to the load unit if the communication unit transmits data to the power supply apparatus,
wherein, if a predetermined power is received from the power supply apparatus, the control unit controls not to supply the power received from the power supply apparatus to the communication unit.

2. The electronic apparatus according to claim 1, wherein, if the communication unit transmits data to the power supply apparatus and a battery is connected to the electronic apparatus, the control unit controls to supply power from the battery to the communication unit.

3. The electronic apparatus according to claim 1, wherein, if the communication unit transmits data to the power supply apparatus, the control unit controls to limit the supply of to the load unit using a first voltage and a second voltage, and wherein the first voltage indicates a voltage of a battery connected to the electronic apparatus, and the second voltage indicates a voltage output so as to transmit data.

4. The electronic apparatus according to claim 3, wherein, if the communication unit transmits data to the power supply apparatus and the first voltage is greater than the second voltage, the control unit does not control to limit the supply of power to the load unit.

5. The electronic apparatus according to claim 3, wherein, if the communication unit transmits data to the power supply apparatus and the first voltage is not greater than the second voltage, the control unit controls to limit the supply of power to the load unit.

6. The electronic apparatus according to claim 1, wherein, if the communication unit does not transmit data to the power supply apparatus, the control unit does not control to limit the supply of power to the load unit.

7. The electronic apparatus according to claim 1, wherein the communication unit performs wireless communication using a Near Field Communication (NFC).

8. An electronic apparatus comprising:
a communication unit that performs wireless communication;
a power receiving unit that wirelessly receives power from a power supply apparatus; and
a control unit that controls a predetermined level if the communication unit transmits data to the power supply apparatus, wherein the predetermined level indicates a level of power used for transmitting data
wherein, if a predetermined power is received from the power supply apparatus, the control unit controls not to supply the power received from the power supply apparatus to the communication unit.

9. The electronic apparatus according to claim 8, wherein, if the communication unit transmits data to the power supply apparatus and a battery is connected to the electronic apparatus, the control unit controls to supply power from the battery to the communication unit.

10. The electronic apparatus according to claim 8, wherein, if the communication unit transmits data to the power supply apparatus, the control unit controls the predetermined level using a first voltage and a second voltage, and wherein the first voltage indicates a voltage of a battery connected to the electronic apparatus, and the second voltage indicates a voltage output so as to transmitting data.

11. The electronic apparatus according to claim 10, wherein, if the communication unit transmits data to the power supply apparatus and the first voltage is greater than the second voltage, the control unit does not change the predetermined level.

12. The electronic apparatus according to claim 10, wherein, if the communication unit transmits data to the power supply apparatus and the first voltage is not greater than the second voltage, the control unit increases the predetermined level.

13. The electronic apparatus according to claim 8, wherein, if the communication unit does not transmit data to the power supply apparatus, the control unit does not change the predetermined level.

14. The electronic apparatus according to claim 8, wherein the communication unit performs wireless communication using on a Near Field Communication (NFC).

15. A control method for an electronic apparatus which has a communication unit, the control method comprising:
performing wireless communication via the communication unit;
wirelessly receiving power from a power supply apparatus; and
controlling to limit a supply of power to a load unit if data is transmitted to the power supply apparatus,
wherein, if a predetermined power is received from the power supply apparatus, not controlling to supply the power received from the power supply apparatus to the communication unit.

16. A control method for an electronic apparatus which has a communication unit, the control method comprising:
performing wireless communication via the communication unit;
wirelessly receiving power from a power supply apparatus; and
controlling a predetermined level if data is transmitted to the power supply apparatus, wherein the predetermined level indicates a level of power used for transmitting data,
wherein, if a predetermined power is received from the power supply apparatus, not controlling to supply the power received from the power supply apparatus to the communication unit.

17. A non-transitory computer-readable recording medium storing a program executed by a computer which has a communication unit, the program causing the computer to perform a control method, the control method comprising:
performing wireless communication via the communication unit;
wirelessly receiving power from a power supply apparatus; and
controlling to limit a supply of power to a load unit if data is transmitted to the power supply apparatus,
wherein, if a predetermined power is received from the power supply apparatus, not controlling to supply the power received from the power supply apparatus to the communication unit.

18. A non-transitory computer-readable recording medium storing a program executed by a computer which has a communication unit, the program causing the computer to perform a control method, the control method comprising:
performing wireless communication via the communication unit;
wirelessly receiving power from a power supply apparatus; and
controlling a predetermined level if data is transmitted to the power supply apparatus, wherein the predetermined level indicates a level of power used for transmitting data.

* * * * *